Jan. 10, 1967   L. W. HAAKER ETAL   3,297,172
MASTER-SLAVE MANIPULATOR
Filed Nov. 13, 1964   21 Sheets-Sheet 3

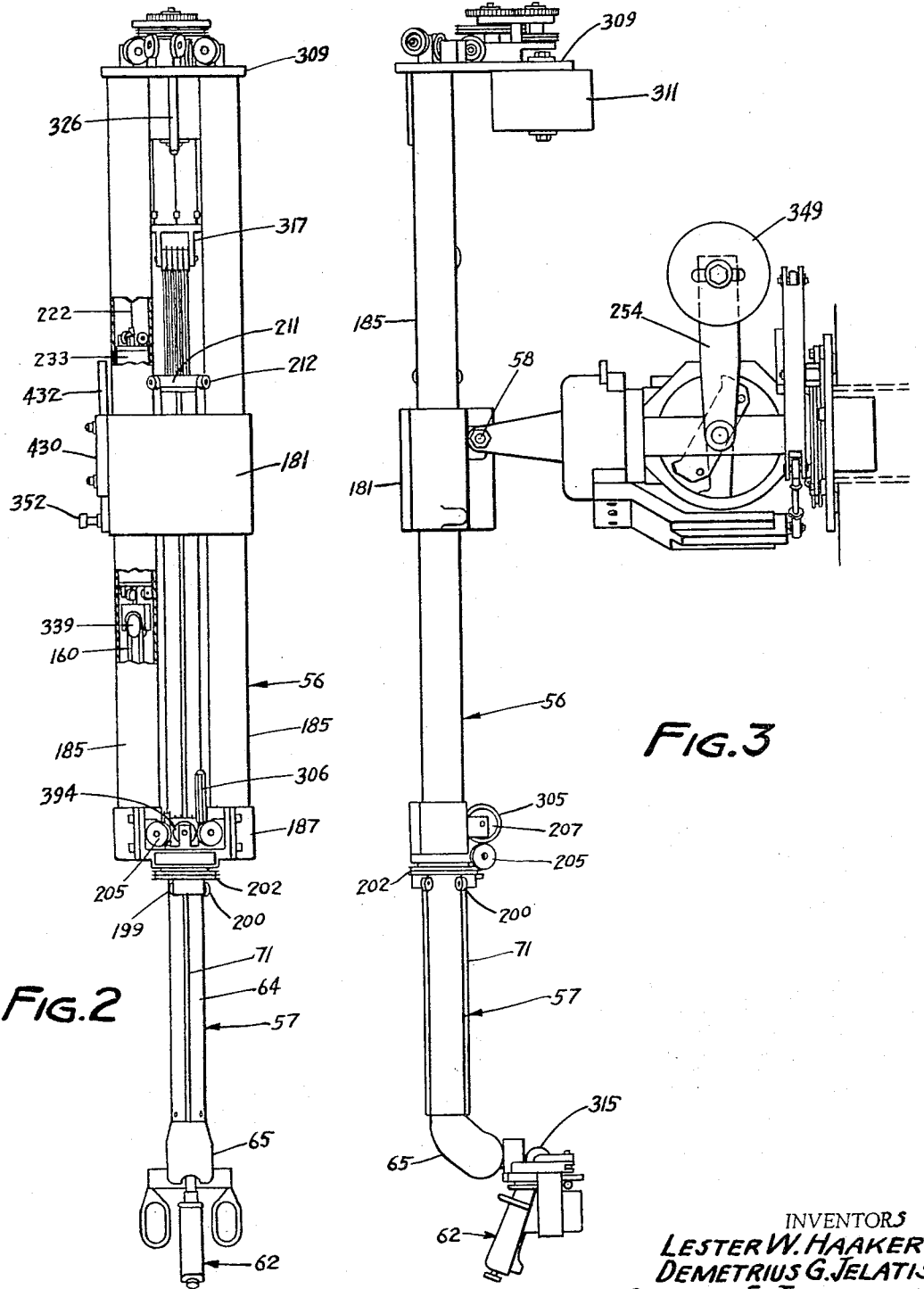

INVENTORS
LESTER W. HAAKER
DEMETRIUS G. JELATIS
CARLETON E. JENNRICH
By Moore, White & Burd
ATTORNEYS

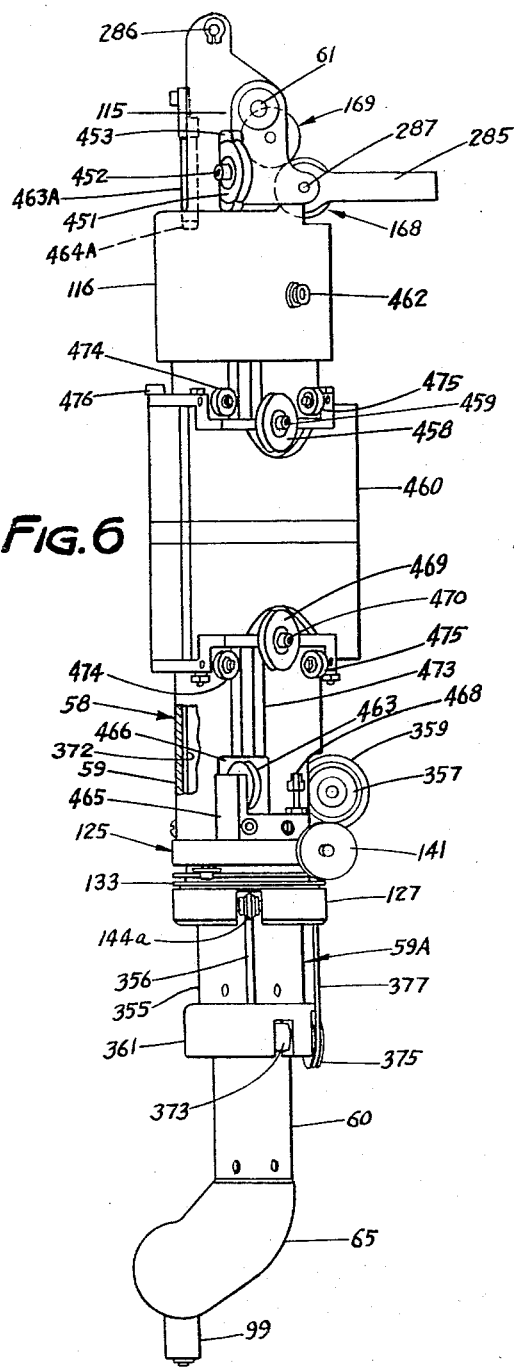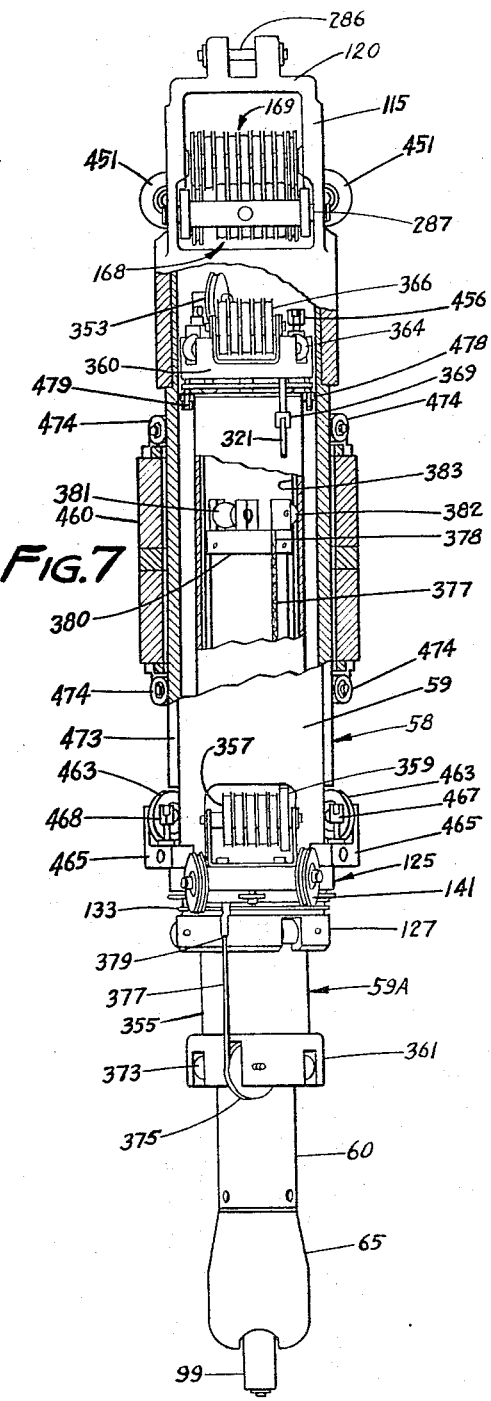

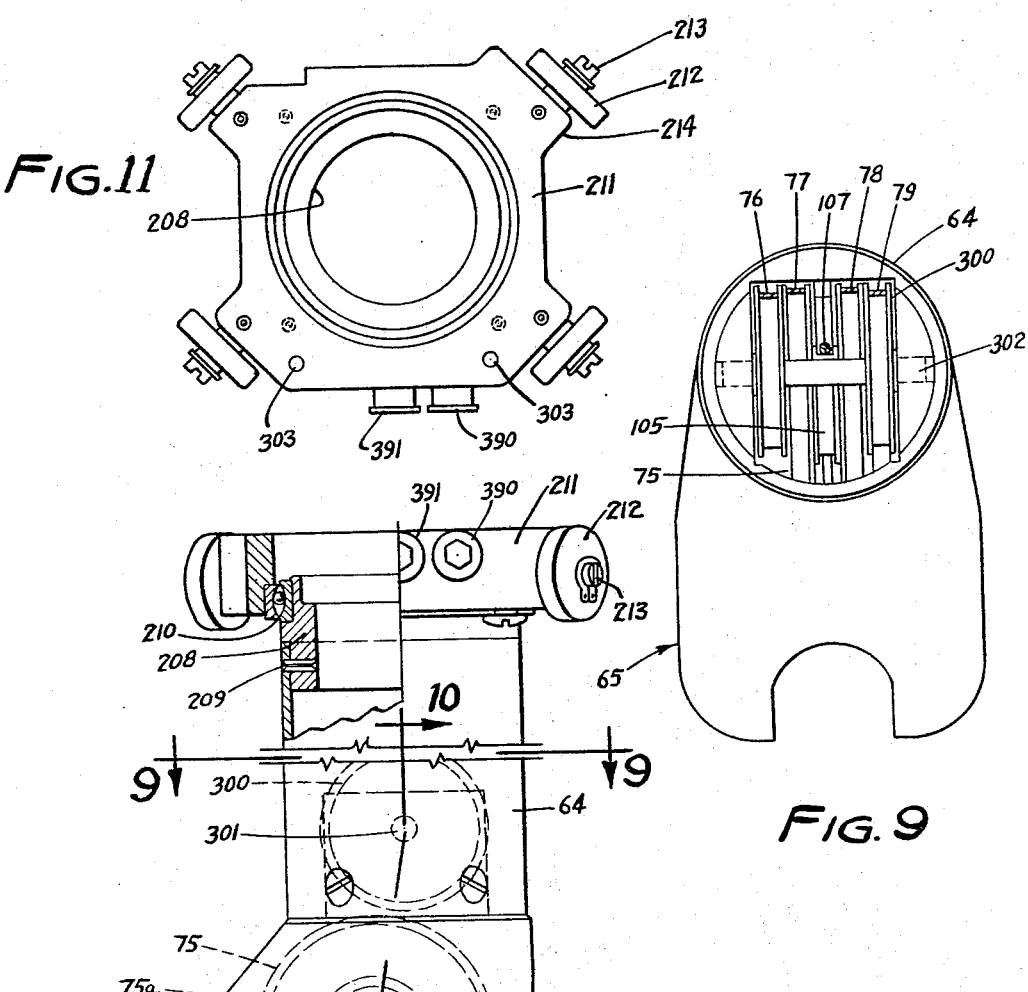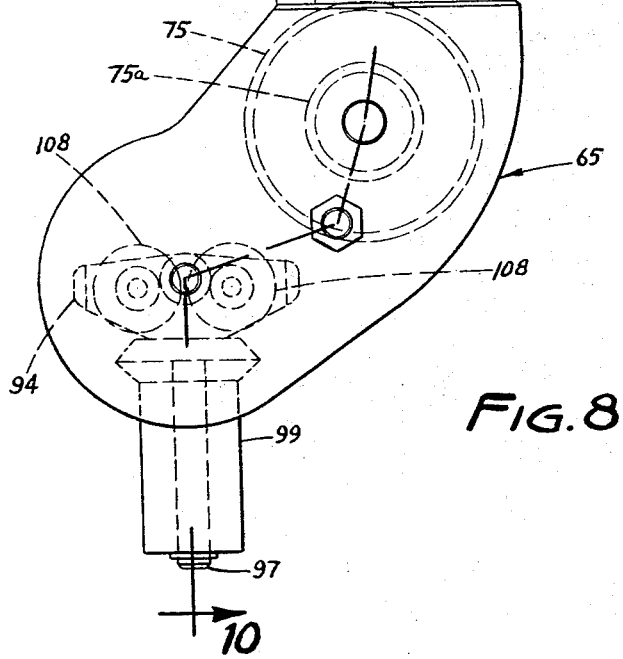

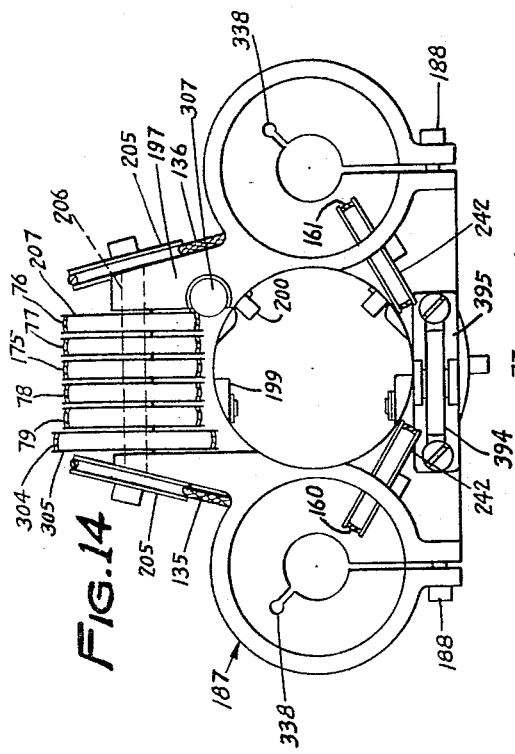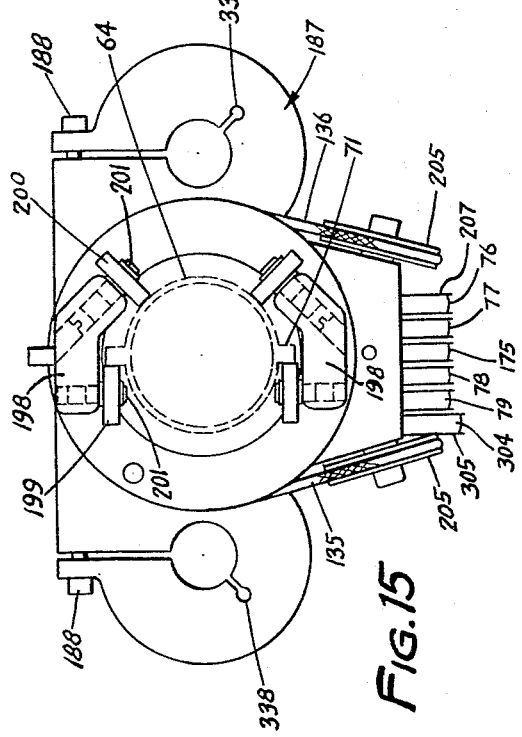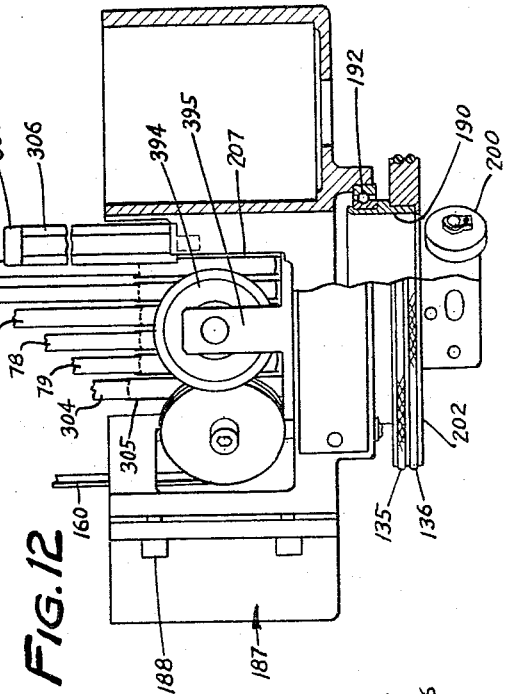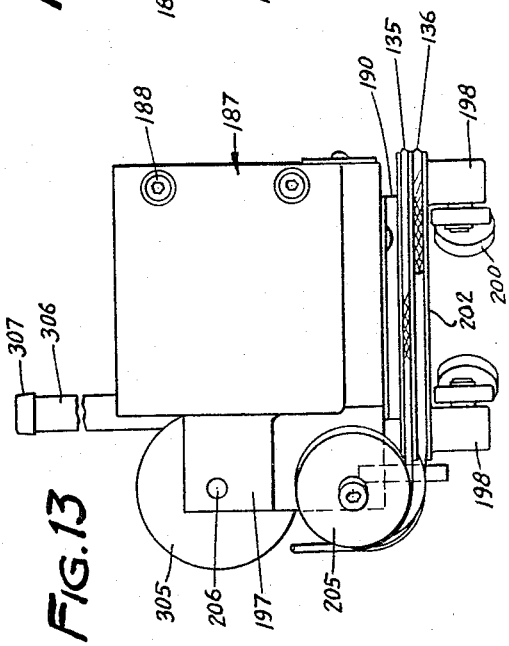

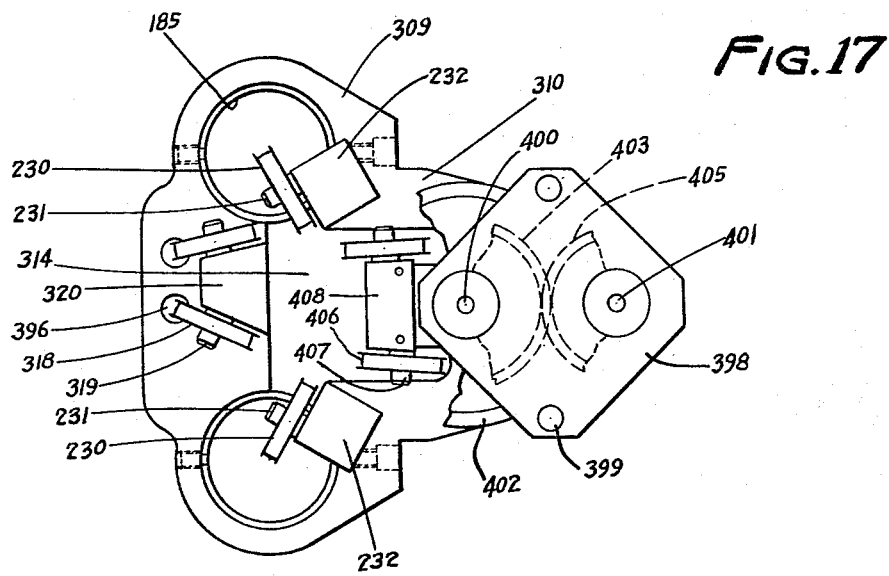
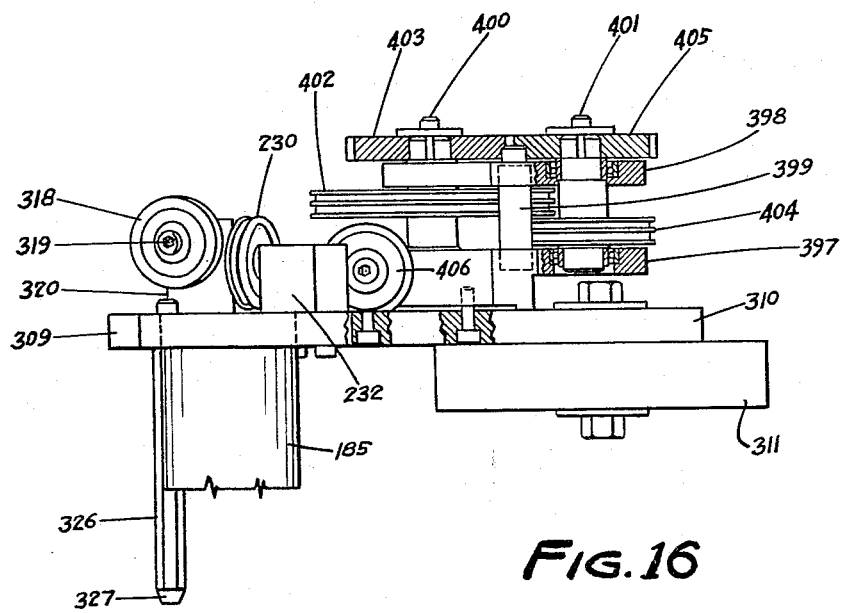

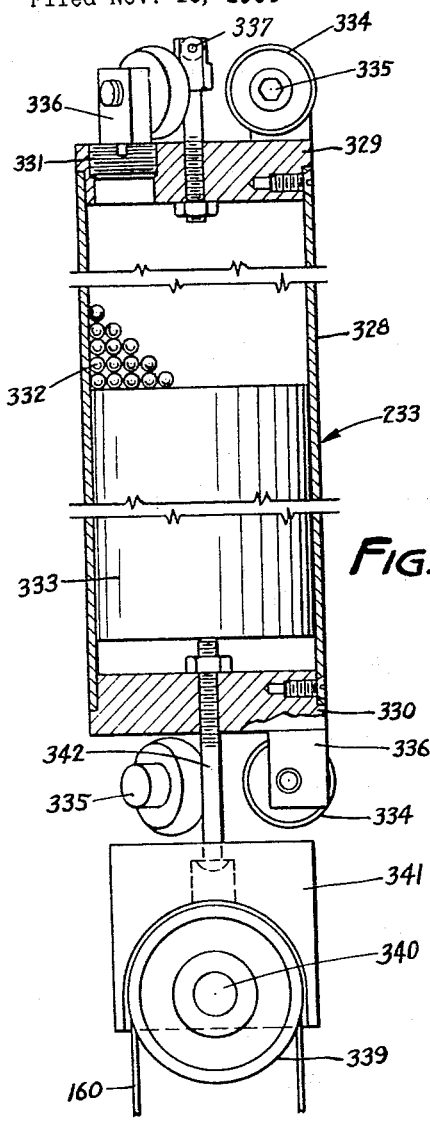
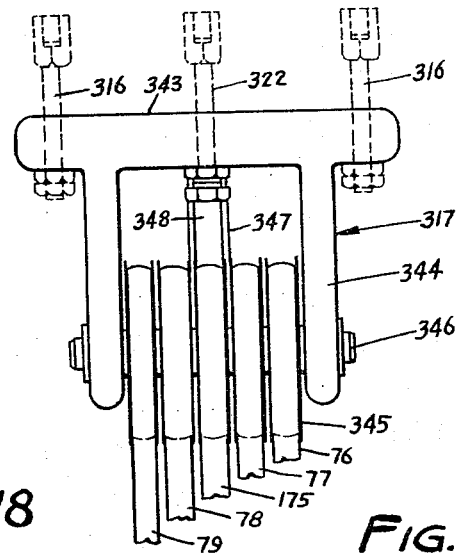
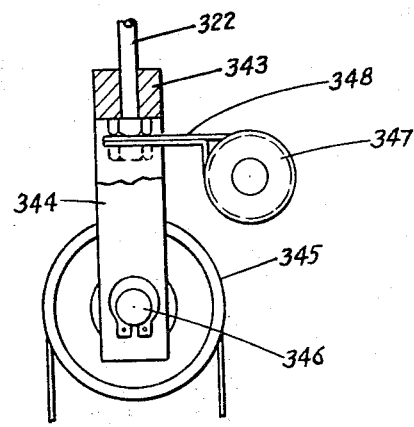
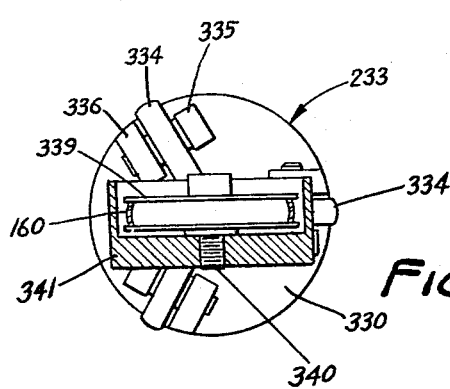

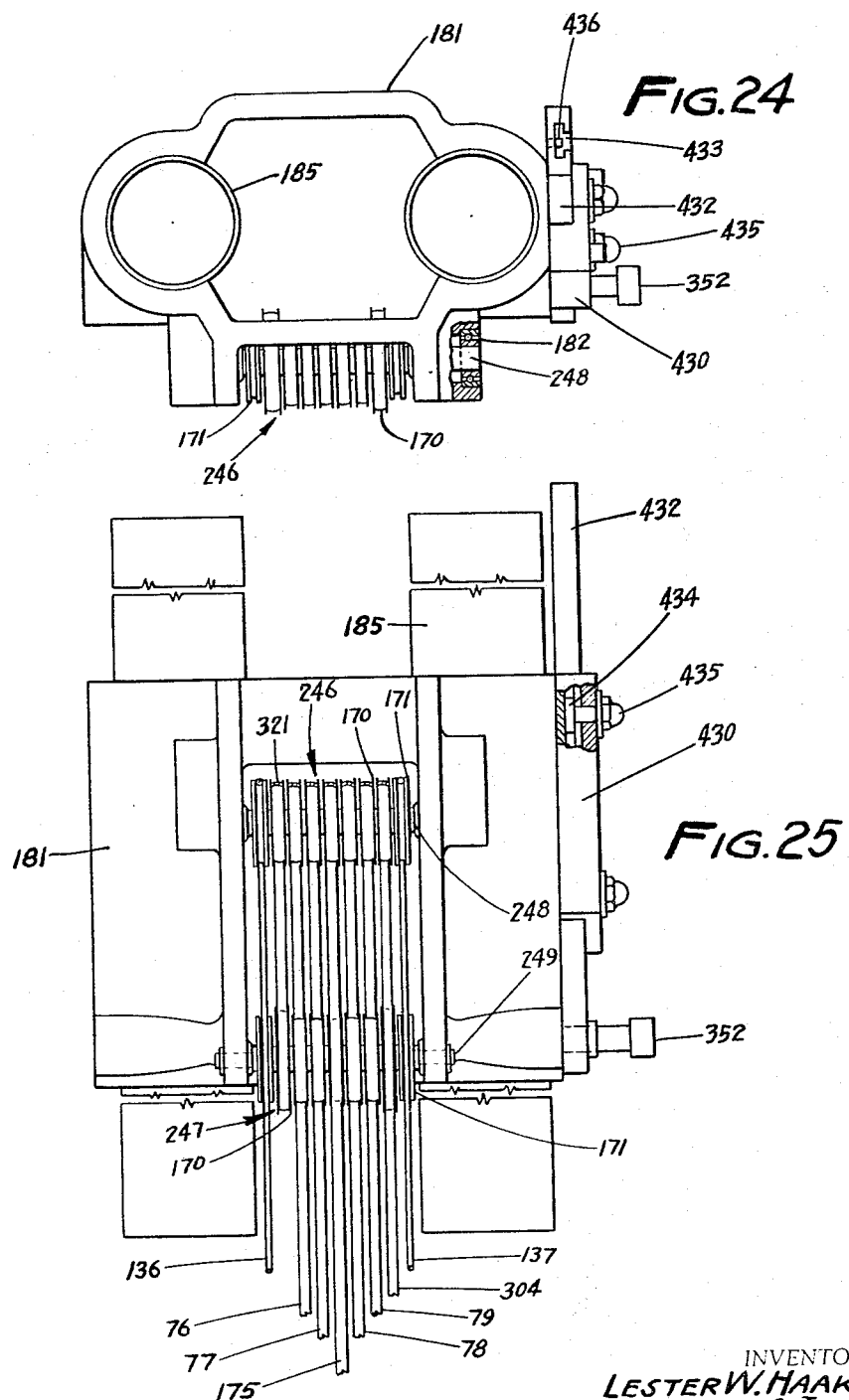

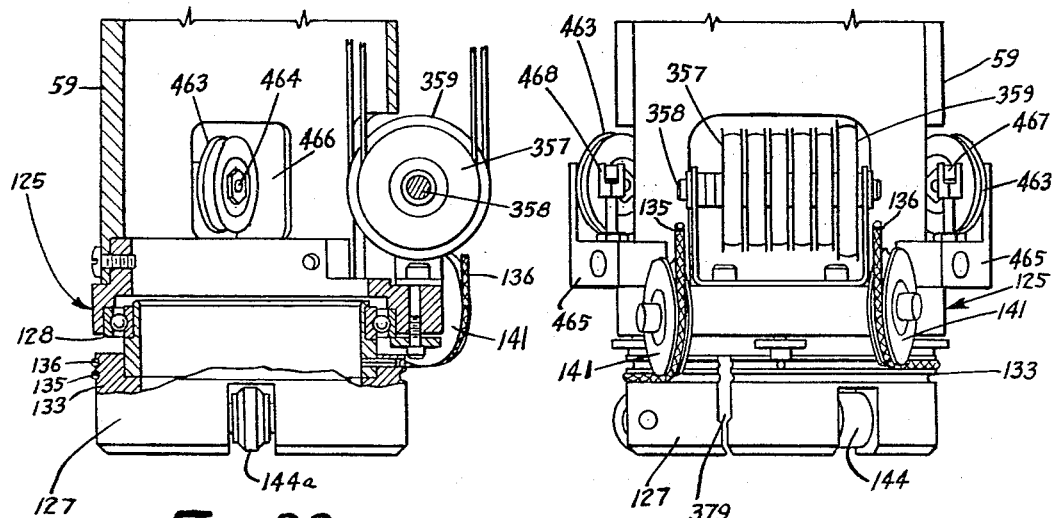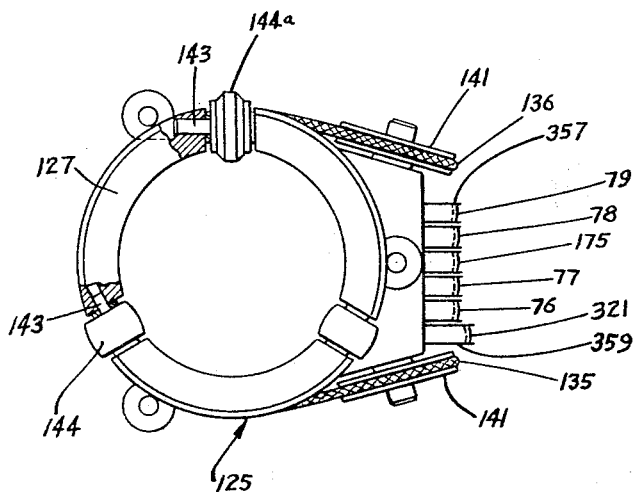

Jan. 10, 1967   L. W. HAAKER ETAL   3,297,172
MASTER-SLAVE MANIPULATOR
Filed Nov. 13, 1964   21 Sheets-Sheet 18

INVENTORS
LESTER W. HAAKER
DEMETRIUS G. JELATIS
CARLETON E. JENNRICH
By Moore, White & Bund
ATTORNEYS

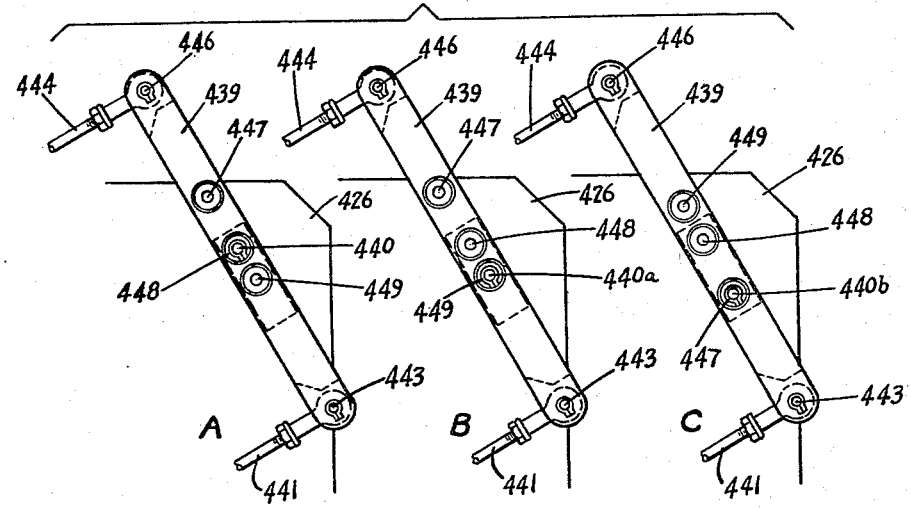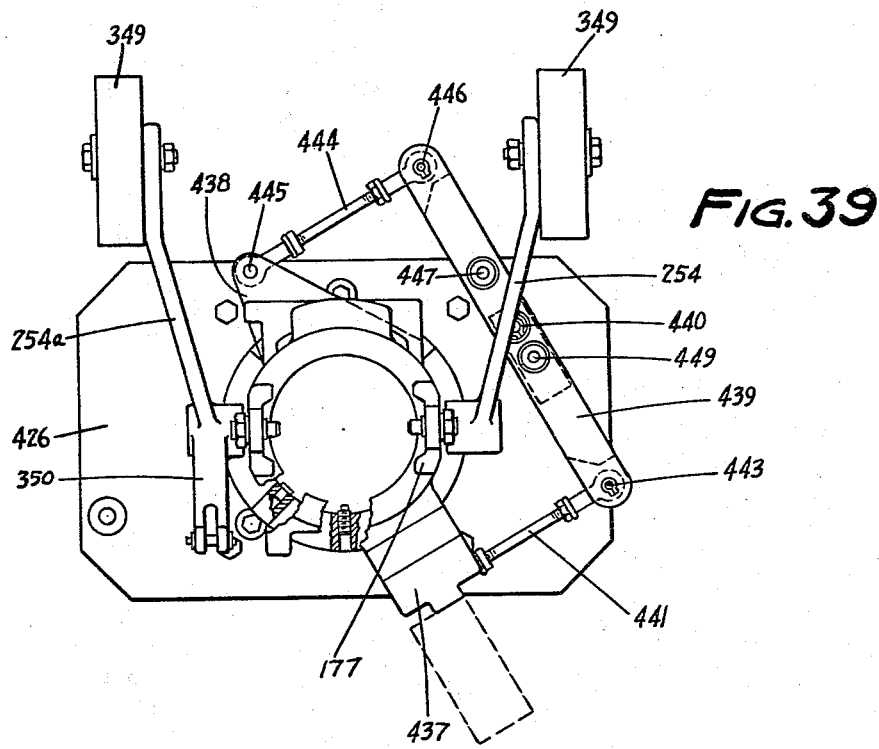

INVENTORS
LESTER W. HAAKER
DEMETRIUS G. JELATIS
CARLETON E. JENNRICH

By Moore, White & Burd
ATTORNEYS

United States Patent Office 3,297,172
Patented Jan. 10, 1967

3,297,172
MASTER-SLAVE MANIPULATOR
Lester W. Haaker and Demetrius G. Jelatis, Red Wing, and Carleton E. Jennrich, St. Paul, Minn., assignors to Central Research Laboratories, Inc., Red Wing, Minn., a corporation of Minnesota
Filed Nov. 13, 1964, Ser. No. 410,924
24 Claims. (Cl. 214—1)

This application is a continuation-in-part of our co-pending application Serial No. 325,921 filed by us on November 26, 1963, now Patent No. 3,261,480 and entitled Compact Master-Slave Manipulator.

This invention relates to a manually operable remote control master-slave manipulator of the type which is used by an operator to perform certain manipulative functions in some area remote from the operator as, for example, on the opposite side of a shielding wall. Manipulators of this general type are well known and widely used, but these known manipulators are for the most part limited in the relationships between the movements of the master and slave arms.

As originally conceived, all motions of the master arm were reproduced in the slave arm in a direct one-to-one ratio. The effective length of the slave arm from pivot to tongs was the same as the effective length of the master arm from pivot to handle. The arms were maintained parallel at all times. If the master arm was moved a given distance in any direction the slave arm was moved the same distance in the same direction. Because this limited the versatility and area of usefulness of master-slave manipulators, through the years various improvements have been made.

It was discovered that the forward reach of the slave arm could be extended by departing from the parallel relationship of the master and slave arms by moving the slave arm angularly outwardly on its pivot relative to the master arm, while still maintaining the longitudinal axes of both arms in the same plane. This so-called extended "Y" motion increased the size of the working space in which the operator could perform manipulations in the slave cell, but all motions were still reproduced in a one-to-one ratio.

Then, it was discovered that the slave arm could be laterally rotated or canted to one side or the other relative to the master arm. Now, the longitudinal axes of the master and slave arms needed no longer to lie in a common plane and manipulators became more versatile and maneuverable as a result. This so-called extended "X" motion could be employed alone or in conjunction with extended "Y" motion to further enlarge the effective area in which remote manipulations could be performed. Motions, however, were still bound by the one-to-one ratio between master and slave.

Subsequently, it was discovered that the slave arm could be lengthened relative to the master arm to extend the reach of the slave arm. This made it possible for the slave arm to be extended with respect to the master arm while the master arm is maintained in operating position at any level of extension. This so-called extended "Z" motion further increased the versatility and range of manipulators. The one-to-one ratio, however, was maintained.

According to the present invention there is now provided a manipulator in which certain of the relationships between the movements of the master arm and slave arm may be varied. That is, movements of the master and slave arms are no longer bound by the one-to-one ratio but may be varied such that a given movement of the master arm will produce a corresponding movement in the slave arm but of different magnitude. Movement of the handle of the master arm a given distance in a given direction may produce, for example, a corresponding movement of the tongs of the slave arm in the same direction but 1½ times the distance, twice the distance, etc.

The variable ratio manipulator is illustrated by the accompanying drawings in which the same numerals refer to corresponding parts and in which:

FIGURE 2 is a front elevation of the master arm assembly;

FIGURE 3 is a right side elevation of the master arm assembly;

FIGURE 6 is a left side elevation of the slave arm assembly;

FIGURE 7 is a front elevation (as viewed by the operator), partly in section, of the slave arm assembly;

FIGURE 8 is an elevation, partly in section, of the master arm boom tube and wrist joint assembly, showing the wrist joint in normal left side elevation and the top of the boom tube in front elevation;

FIGURE 9 is a top plan of the wrist joint assembly shown as a section on the line 9—9 of FIGURE 8 and in the direction of the arrows;

FIGURE 11 is a plan view of the top of the master arm boom tube;

FIGURE 12 is a front elevation, partly in section, of the the master arm azimuth assembly;

FIGURES 13 is a left side elevation of the master arm azimuth assembly;

FIGURE 14 is a top plan view of the master arm azimuth assembly;

FIGURE 15 is a bottom plan view of the master arm azimuth assembly;

FIGURE 16 is a right side elevation, partly in section, of the master arm counterweight bracket assembly, including means by which variable ratio "Z" motion may be effected.

FIGURE 17 is a top plan view of the master arm counterweight bracket assembly, shown partially broken away to reveal underlying structure;

FIGURE 18 is an elevation, partly in section, of the Z motion counterweight assembly of the master arm;

FIGURE 19 is a bottom view of the Z motion counterweight assembly;

FIGURE 20 is a front elevation of the half speed carriage assembly of the master arm;

FIGURE 21 is a right side elevation of the master arm half speed carriage;

FIGURE 24 is a top plan view of the master pivot assembly;

FIGURE 25 is a rear elevation of the master pivot assembly;

FIGURE 28 is a left elevation, partly in section, of the slave azimuth assembly;

FIGURE 29 is a front elevation of the slave azimuth assembly;

FIGURE 30 is a bottom plan view, partly in section, of the slave azimuth assembly;

FIGURE 39 is a front elevation of an alternative master pivot ears and rocker assembly utilizing a lever system for achieving variable ratio "X" motion;

FIGURE 40 is a fragmentary elevation showing the relative positions of the pivot arm for three different "X" motion ratios;

Throughout this application the manipulator is described and illustrated in terms of a single horizontal tubular support with a single master arm and a single slave arm. It is to be understood, however, that in virtually all instances the manipulators are employed in spaced pairs so that the operator by the use of two master arms is able to manipulate two slave arms in order to simulate the actions of a pair of hands in the remote area on the opposite side of the barrier wall.

Figure 1:
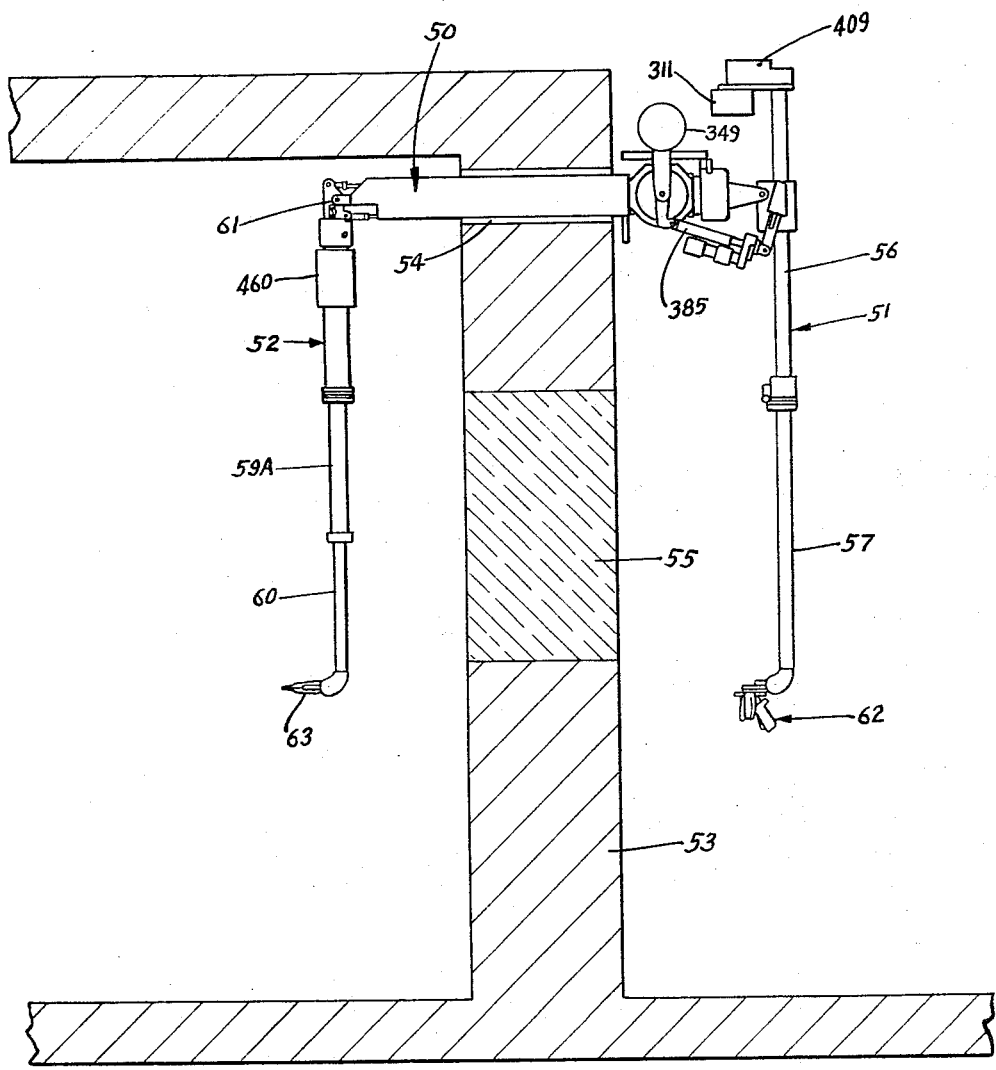
FIGURE 1 is a left side elevation (from the viewpoint of the operator) showing in somewhat simplified form the assembled variable ratio manipulator according to the present invention installed in a wall.

*General assembly of parts.—FIGURE 1*

Referring now to the drawings, and particularly to FIGURE 1, the variable ratio remote control manipulator of the present invention comprises generally a horizontal tubular support 50, a master arm 51 and a slave arm 52. The horizontal support 50 extends through a generally vertical shielding wall 53, being mounted therein for rotation in a sleeve or tube 54 set in the wall. As is well understood, the thickness of the wall and the material of which it is composed will depend upon the shielding purpose of the wall. The wall is provided with a window 55 through which the operator in a safe area to the right of the wall may observe the manipulative movements of the slave arm in the dangerous area or hot cell to the left of the wall.

For convenience in describing the present invention, insofar as possible, the same numbering system is employed to designate corresponding parts as is used in United Statse Patent No. 2,764,301 issued on September 25, 1956 to Goertz et al. and United States Patent No. 2,771,199 issued on November 20, 1956 to Jelatis. The subject matter of these patents is incorporated herein by reference to the extent that might be necessary to better understand that structure and those movements held in common between the present manipulator and those of the prior patents, in order to avoid burdening the present application with disclosure of subject matter old in the art.

*The master arm.—FIGURES 1, 2 and 3*

The master arm 51 comprises a dual tubular trunk tube 56 which is stationary so far as relative vertical movement is concerned, but is pivotally connected at 58 to the horizontal support. The master arm also includes a movable boom tube 57 which is slidable longitudinally relative to the trunk tube portion to move toward and away from the pivot. A handle 62 at the lower end of the master arm boom tube is engaged by the hand of the operator and by appropriate movements which are transmitted along the arm 51 and the support 50 and slave arm 52 controls the movement of a claw or tong 63 connected to the lower end of the boom tube 60 of the slave arm.

The handle means whose construction and operation are described generally in Goertz United States Patent No. 2,695,715 issued November 30, 1954 is adapted for use in the present manipulator. The details of construction of the handle accordingly are not repeated here. An improved handle means also adapted for use in connection with the present manipulator is described and claimed in copending United States application Serial No. 351,964 filed March 16, 1964 by Gordon M. Lee.

Figure 4:
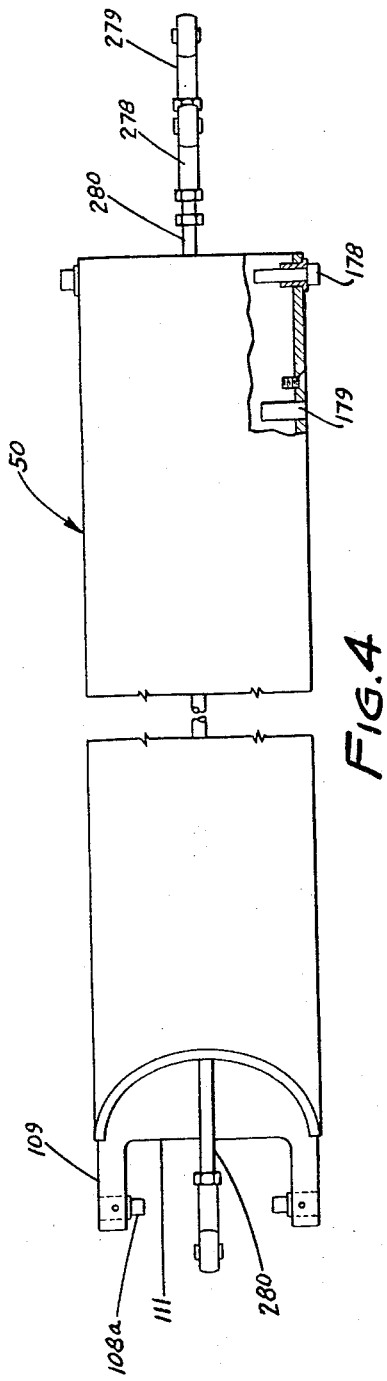
FIGURE 4 is a top plan of the through tube and tie rod assembly.
Figure 5:
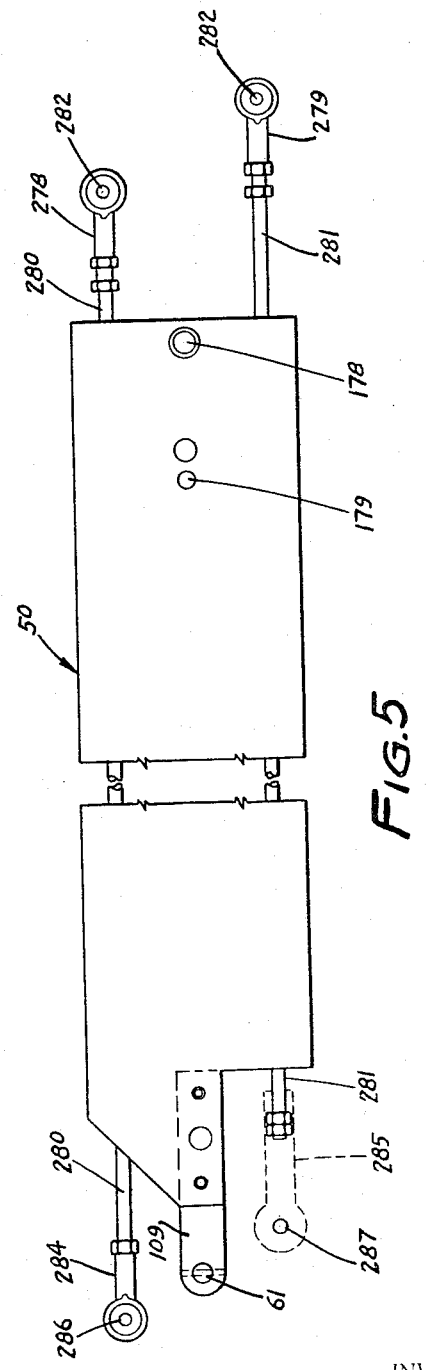
FIGURE 5 is a left side elevation of the through tube and tie rod assembly.
Figure 10:
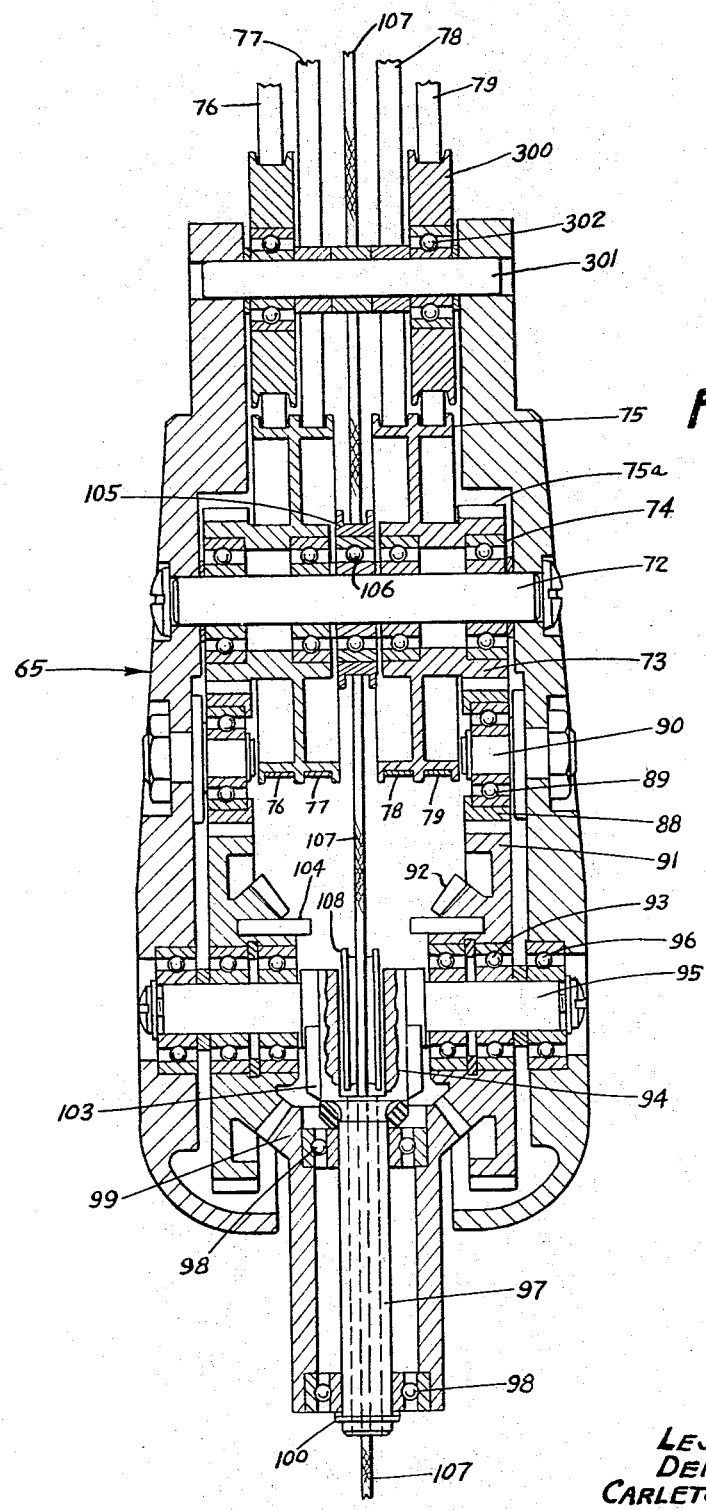
FIGURE 10 is an extended section of the wrist joint assembly on the line 10—10 of FIGURE 8 and in the direction of the arrows.

*Through tube and tie rod assembly.—FIGURES 1, 4 and 5*

The horizontal support 50 is rotatable within tube 54 about their common longitudinal axis to permit side-to-side movements of the master arm (or X motion) to be imparted to the slave arm. Horizontal support 50 is tubular so as to provide a passage for linear motion transmitting means from one side of the shielding wall to the other. Movement of the master arm toward and away from the protective wall (or Y motion) is transmitted to the slave arm through the horizontal support 50 by means of a pair of upper and lower links or tie rods 280 and 281, respectively. The tie rods 280 and 281 are provided with fittings 278 and 279, respectively, for pivotal connection between the master arm rocker element and the tie rods as hereinafter described. The opposite ends of the tie rods are provided with fittings 284 and 285 by means of which the tie rods are pivotally connected to the slave arm, as hereinafter described. The slave arm pivot 61 is formed by a pair of stub shafts 108a carried by a pair of ears 109 which form a part of a yoke 111 secured within the slave end of the horizontal support 50.

*The slave arm.—FIGURES 1, 6 and 7*

The slave arm 52 comprises a tubular trunk tube portion 59 which is stationary relative to vertical movement. The slave arm of the present manipulator includes an intermediate tube 59A which fits telescopically within the slave trunk tube 59 and is movable longitudinally relative to the slave trunk tube. A slave boom tube 60 is fitted telescopically within the intermediate tube 59A and is movable longitudinally relative to the intermediate tube. The slave arm trunk tube 59 is pivotally connected at 61 to the horizontal support. A tubular counterweight member 460 is suspended for vertical movement relative to trunk tube 59.

Master arm boom tube with wrist joint assembly.—
FIGURES 2, 3, 8, 9, 10 and 11

The master arm boom tube 57 includes an elongated tube 64, the lower end of which carries a housing 65 for the wrist joint. The housing 65 is formed of complementary halves which are secured to one another by suitable fastening means. The opposite walls of the housing receive the ends of shaft 72 on which is mounted a pair of tubular members 73 by means of two pairs of ball bearings 74. Each tubular member 73 has a pair of take-up sections 75 and a spur gear section 75a. The four take-up sections 75 in the form of a grooved drum or pulley receive four metal tapes 76, 77, 78 and 79, which have their ends anchored in the take-up sections. These tapes transmit elevation and twist motions. Tapes 76 and 79 extend in one direction around the take-up members and tapes 77 and 78 are wrapped in opposite directions around the take-up members. The spur gear sections 75a of the tubular members 73 mesh with idler gears 88 journaled by means of ball bearings 89 in shafts 90 supported in the housing.

Idlers 88 in turn mesh with spur gears 91 which are secured to beveled differential gears 92 journaled by two pairs of ball bearings 93 on trunnions 95 of yoke 94. Trunnions 95 are journaled in the housing by means of ball bearings 96. The yoke 94 also has a shaft 97 which by means of two ball bearings 98 journals a bevel gear 99 which is in mesh with the differential gears 92 whose gear ratio is approximately 1:1 in order to provide about equal stiffness in both the elevation and twist motions. The bevel gear 99 is held in mesh with the differential gears by means of a snapring 100 which is at the lower side of the lower ball bearing 98.

Angular movement of the yoke 94 about the trunnions 95 is limited by means of the dimensions of the opening in the housing through which the shank of bevel gear 99 extends. The wrist joints of the slave arm are of similar construction. The handle 62 or the tongs 63 is secured to the shank of the bevel gear. Projections 103, which are cast into the yoke, lie in the path of pegs 104 which are set in the differential gears 92. Engagement of the pegs 104 with the projections 103 limits the angular movement of the differential gears 92 in both directions and, since the take-up sections 75 are geared to the differential gears 92, the angular movement of the take-up sections is limited, with corresponding limit of tape movement.

A guide pulley 105 is journaled on the shaft 72 by means of ball bearing 106 between the tubular members 73. The pulley 105 is engaged by tong cable 107 which extends thereover, being guided between two guide pulleys 108 journaled by ball bearings on the yoke 94. The cable 107 extends from the pulleys 108 through the hollow shaft 97 of the yoke 94 to the cable pulley 315 of handle 62, in the case of the master arm wrist joint. The corresponding cable 107a similarly extends from the slave arm wrist joint to operate the tong means, as more fully described hereinafter. A pair of guide pulleys 300 for tapes 76 and 79 are journaled on a shaft 301 in the top of the wrist joint housing by means of ball bearings 302.

The top end of tubular boom tube 64 is provided with an annular extension 208 secured by fastening means 209 and supporting a bearing 210, which in turn supports an annular boom tube head member 211. The head member 211 is provided with a plurality of rollers 212 which are adapted to engage tubular guides 185 of the master arm trunk tube 56 so as to permit the head 211 to have generally vertical movement along the tubular guides while preventing the head from rotating with respect to the guide. The rollers 212 are journaled on shafts 213 which are mounted on bosses 214 on the head 211. The connection of the upper end of the tubular structure 64 of the master arm with the head 211 through the extension 208 and the bearing 210 is such as to permit rotational movement of the tubular boom tube with respect to the head while preventing axial movement of the tubular structure with respect to the head. The head member is also provided with anchorage ports 303 to receive the fittings securing the ends of the counterweight tapes 160 and 161. A pair of studs 390 and 391 are provided on the front edge of the boom tube head 211 to serve as anchorages for Z motion tapes 392 and 393, respectively.

Master arm azimuth assembly.—FIGURES 2, 3, 12, 13, 14 and 15

As shown in FIGURES 12 to 15, a bracket 187 is secured to the lower ends of the tubular guides 185 which comprise part of the master arm trunk tube by means of clamping screws 188. A ring or rotating body 190 is rotatably mounted in the lower central portion of the bracket 18 by means of bearing 192. The rotary body 190 has two axially extending projections 198, each of which carries rollers 199 and 200, each mounted on a shaft 201. On each extension 198 the rollers 199 and 200 extend at approximately 45 degree angles to one another and rollers 199 engage the sides of the vertical ribs 71 formed in the tubular portion 64 of the master arm boom tube 57. Thus, the rollers 199 and 200 constitute keys that permit axial movement of the master arm boom tube with respect to the rotary body 190 while preventing rotational movement of the boom tube with respect to the rotating body.

The azimuth assembly includes a cable take-up portion in the form of a double grooved pulley 202 mounted for rotation with rotating ring member 190. The ends of azimuth motion cables 135 and 136 are received in the grooves of the double grooved take-up pulley 202. The cables whose ends are anchored in pulley 202 extend around the pulley in opposite directions and then extend over grooved guide pulleys 205 and, thence, upward toward pivot 58 of the master arm on the horizontal support.

The elevation and twist motion tapes 76, 77, 78 and 79 and tong tape 175 from the master arm wrist joint run over pulleys 207 which are journaled to rotate on shaft 206 mounted in ears 197 of bracket 187. Guide pulleys 242 are journaled for rotation in azimuth bracket 187 for the purpose of receiving master arm Z motion counterweight tapes 160 and 161 in their paths from their anchorages at 338 in bracket 187, around guide pulleys 339 and downwardly through the lower ends of tubular members 185 and then guide these tapes upwardly to their anchorages 303 in annular head 211 at the top of the master arm boom tube.

One of the Z motion tapes 304 which transmits vertical movements of the master arm to the slave arm passes around a further pulley 305 mounted on shaft 206 with pulleys 207 in the path of the tape from its anchorage in drum 404 at the top of the master arm trunk tube. Tape 304 extends downwardly along the back of the boom tube around pulley 305 and then back upwardly towards the master pivot 58.

Another of the Z motion tapes 392, which extends from stud 390 at the head of the boom tube, passes around pulley 394 which is journaled in bracket 395 at the front edge of the azimuth bracket.

A vertically extending bumper member 306 provided with a resilient pad or tip 307 of rubber or other similar material is mounted on the upper surface of azimuth assembly 187 in the path of the angular head 211 at the top of the master boom tube to limit the extent of movement of that member.

Master arm counterweight assembly and variable Z motion change gear assembly.—FIGURES 2, 3, 16 and 17

A counterweight bracket 309 is supported at the top ends of the dual tubular guides 185 of the master arm trunk tube. The counterweight bracket is provided with a rearwardly projecting extension 310 from which a counterweight 311 of suitable size and weight to partially counterbalance the master arm is suspended. Slots are desirably provided in the bracket extension 310 and counterweight 311 to permit adjustment of the position of the counterweight. A central opening 314 in the counterweight bracket overlies the top of the vertically movable master arm boom tube between the trunk tube tubular guides 185. A pair of guide pulleys 230 journaled on shafts 231 carried by posts 232 on the top side of the counterweight bracket are positioned so that one side of the pulley overlies the hollow tubular support 185 and the other side overlies the central opening.

Counterweight tapes 222 and 223 each are adapted to extend from an elongated counterweight assembly 233 located within one of the tubular guides 185, up and over the guide pulley 230 to an anchorage 316 in a half speed carriage assembly 317, which is described in greater detail hereinafter. A further pair of guide pulleys 318 are journaled for rotation on shafts 319 supported by post or block 320 on the upper portion of the counterweight bracket above a pair of tape passage openings 396.

A lower bearing plate 397 is supported on the upper surface of counterweight bracket 309. An upper bearing plate 398 is supported spaced above lower bearing plate 397 by means of a pair of spacer members 399. A pair of parallel shafts 400 and 401 are journaled for rotation in the bearing plates 397 and 398. Shaft 400 carries a double grooved master tape drum 402 and a master change gear 403 which are rotatable together. Shaft 401 carries a double grooved slave tape drum 404 and a slave change gear 405 which are rotatable together. The master tape drum 402 and slave tape drum 404 are offset axially with respect to one another but the master change gear 403 and slave change gear 405 are in a common plane and their teeth mesh so that rotation of master change gear 403 causes rotation of slave change gear 405.

The Z motion ratio between the master arm and slave arm is varied as desired or required by varying the gear ratio between master change gear 403 and slave change gear 405. For example, in the arrangement illustrated a 1 to 1 ratio exists when master gear 408 has 48 teeth and slave gear 405 has 42 teeth. When these two gears are reversed the ratio is 3.06 to 4. A 1 to 1.98 ratio is obtained when master gear 403 has 57 teeth and slave gear 405 has 33 teeth. A 2 to 3 ratio is obtained when master gear 403 has 51 teeth and slave gear 405 has 39 teeth. The ratio may be varied almost infinitely, as required.

A still further pair of guide pulleys 406, journaled for rotation on shafts 407 supported by block 408, are provided for Z motion slave tapes. For clarity the structure is shown without the tapes in place. However, by reference to the schematic illustration of FIGURE 35 it will be seen that master Z motion tape 393 is wrapped around the upper groove of drum 402 in one direction and is guided over one of pulleys 318 in its path to tape terminal 391 on the head fittting 211 at the top of the master boom tube. Similarly, it will be seen that the master Z motion tape 392 is wrapped around the lower groove of drum 402 in the opposite direction and passes over the other guide pulley 318 in its path around pulley 394 on the master azimuth assembly to tape terminal 390 at the top of the master boom tube.

Slave Z motion tape 304 is wrapped in one direction about the lower groove of drum 404 and is guided over pulley 406 in its path around pulley 305 on the master azimuth assembly and around the pivot assembly pulley banks 170 on its path through the tubular support to the slave arm. Slave Z motion tape 321 is wrapped in the opposite direction in the upper groove of drum 404 and is guided over pulley 406 in its path to pulley banks 170 and thence to the slave arm.

As shown in FIGURE 1, the counterweight bracket and change gear assembly is desirably provided with a cap or cover 409 which forms a protective housing enclosing the mechanism.

A further bumper 326 provided with a resilient tip 327 projects downwardly from the bottom surface of the counterweight bracket in the path of the head of the master arm boom tube in order to limit the upward movement of the boom tube.

*Master arm Z motion counterweight assembly.—*
*FIGURES 2, 18 and 19*

The master arm Z motion counterweight assembly 233 is positioned in each of the guide members 185 of the master arm trunk for movement therein. Each counterweight assembly 233 comprises an elongated hollow tubular member 328 closed at its opposite ends by an upper end member 329 and a lower end member 330. The upper and lower end members are of similar construction except that the upper end member 329 is provided with an opening which is closed by a plug 331 for the introduction of lead shot 332. Preferably the tube 328 is partially filled by a solid lead cylinder 333 and additional weight as needed is introduced in the form of shot.

The upper and lower end members of the counterweight assembly are provided with a plurality of rollers 334 each adapted to rotate on a shaft 335 extending from a post 336 projecting from the surface of the end member. The rollers 334 are substantially uniformly spaced about the periphery of the counterweight end members and project slightly beyond that periphery to bear against the inner cylindrical walls of the tubular guide members 185.

One end of counterweight tapes 222 and 223 is attached to an anchor means 337 centrally disposed in the upper counterweight end member of each of the counterweight assemblies. A pulley 339 is journaled to rotate on shaft 340 mounted in pulley block 341 which is suspended below the bottom of the lower counterweight end member 330 by means of a bolt 342. Z motion counterweight tapes 160 and 161 extend around pulley 339 in their paths from their anchorages 338 in the azimuth bracket 187 to guide pulleys 242 in the azimuth assembly and then upwardly to their anchorages 303 in the head at the top of the boom tube.

*Master arm variable speed carriage.—*
*FIGURES 2, 20 and 21*

In the illustrated form of manipulator according to the present invention, a half-speed carriage 317 is mounted in the space between the tubular guides 185 of the master arm trunk and between the top of the annular head 211 of the master arm boom tube and the bottom surface of counterweight bracket 309. The half-speed carriage assembly is in the form of a yoke having a horizontal bar 343 and a pair of spaced apart downwardly extending legs 344. The half-speed carriage assembly is supported by being suspended from the Z motion counterweight tapes 222 and 223 which are anchored at 316 to the top bar 343 of the carriage assembly.

A plurality of pulleys 345 are journaled to rotate on a shaft 346 between the legs 344 of the half-speed carriage. The elevation and twist motion tapes 76, 77, 78 and 79 and tong tape 175 pass up and over pulleys 345 in their paths between the master arm wrist joint and the pulley bank of the master arm azimuth assembly. The result is that the boom tube is suspended from the half-speed carriage which in turn is suspended from the counterweight bracket and the boom tube is counterbalanced by means of the counterweight assembly 233. An optional guide member 347 is supported from the bottom edge of the horizontal bar portion of the half-speed carriage by means of a bracket 348 secured by fastener 322 for the purpose of guiding an electrical cable used to power electrical assist means optionally incorporated into the manipulator.

*Master arm ears and rocker and pivot assemblies and variable X motion change gears.—FIGURES 2, 3, 22, 22A, 22B, 23, 24 and 25*

Figure 22:
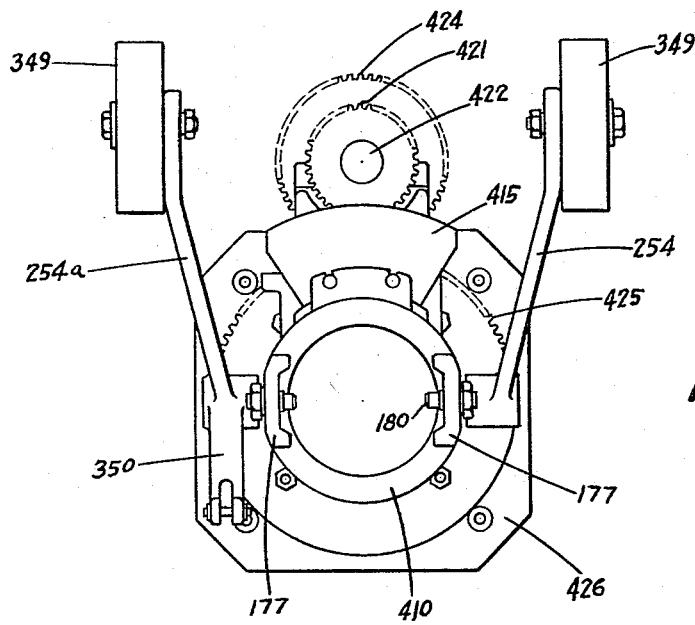
FIGURE 22 is a front elevation of the master pivot ears and rocker assembly, showing change gear means for achieving variable ratio "X" motion.
Figure 23:
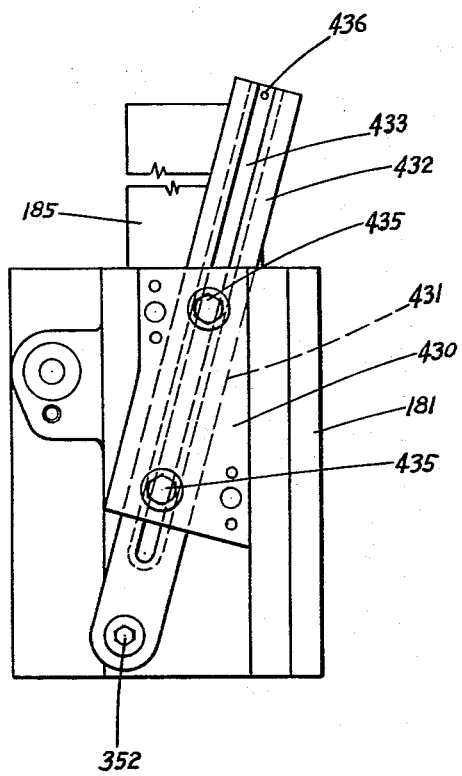
FIGURE 23 is a left hand elevation of the master pivot assembly showing means for introducing variable ratio to the "Y" motion.
Figure 22A:
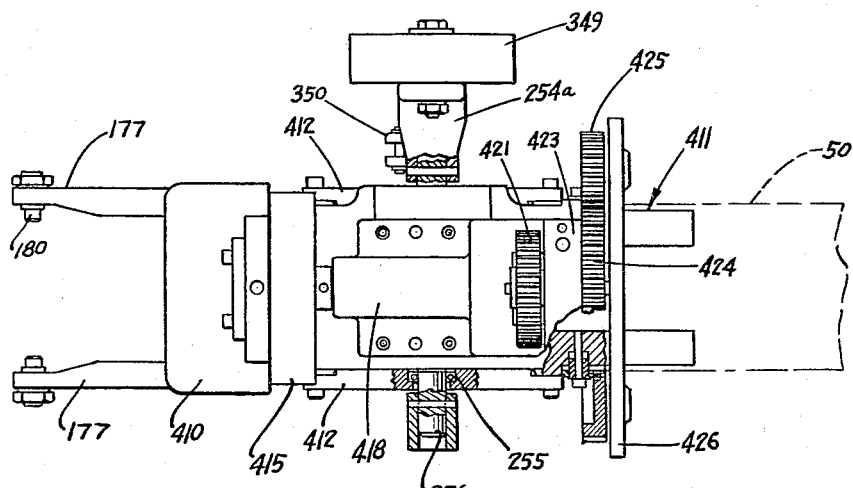
FIGURE 22A is a top plan view, partly in section, of the master pivot ears and rocker assembly of FIGURE 22.
Figure 22B:
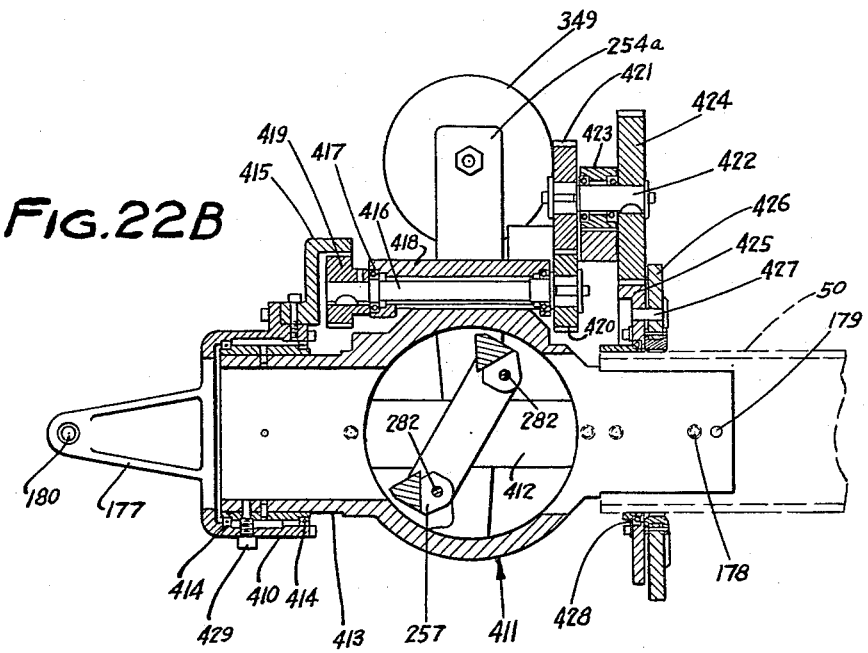
FIGURE 22B is an elevation in section of the master pivot ears and rocker assembly of FIGURE 22.
Figure 32:
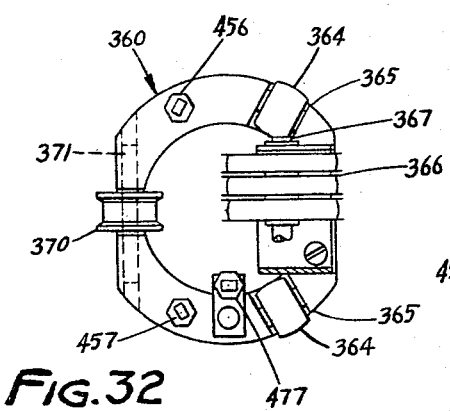
FIGURE 32 is a top plan view of the intermediate tube assembly.
Figure 27:
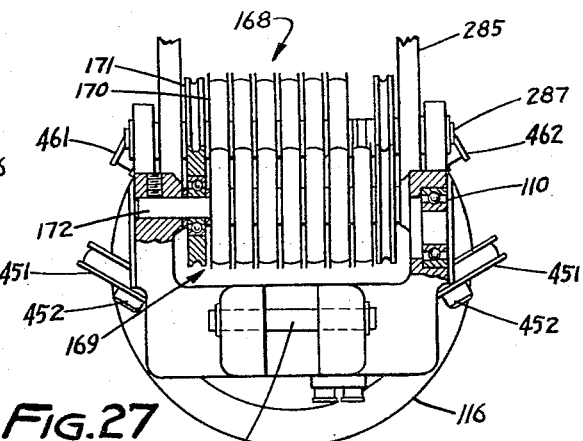
FIGURE 27 is a top plan view, partly in section, of the slave pivot assembly.
Figure 31:
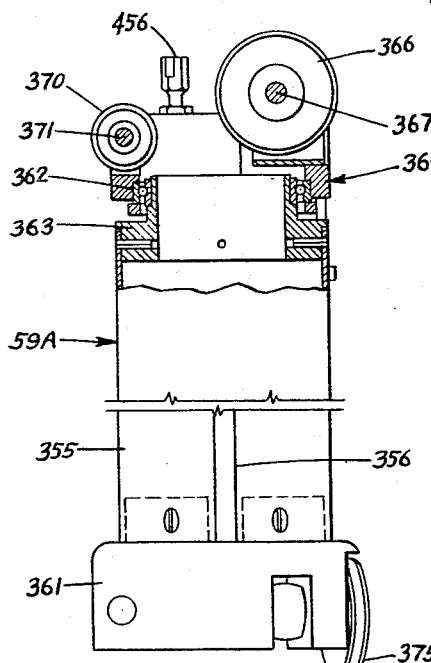
FIGURE 31 is a left elevation, partly in section, of the intermediae tube assembly of the slave arm.
Figure 26:
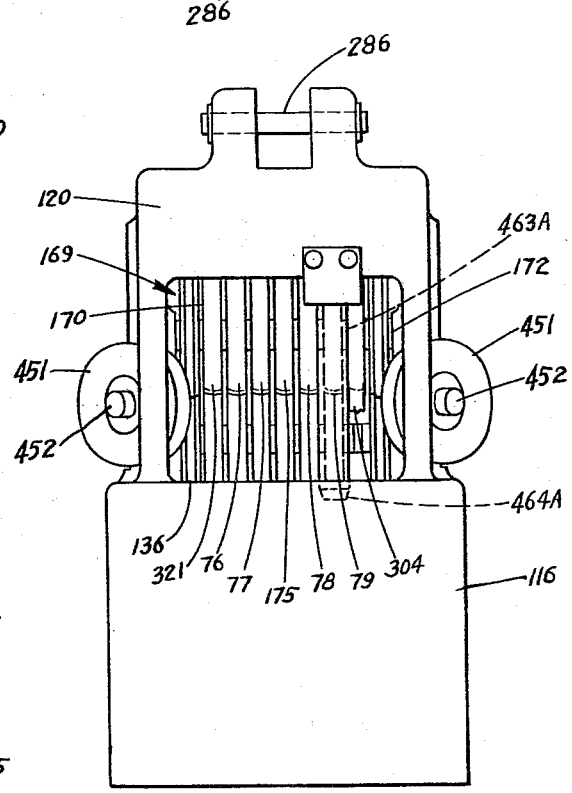
FIGURE 26 is a rear elevation, as viewed by the operator, of the slave pivot assembly.
Figure 33:
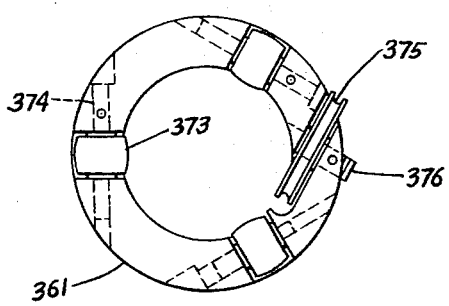
FIGURE 33 is a bottom plan view of the intermediate tube assembly.

The means by which the master arm is connected to the horizontal support and one means by which variable ratio X motion is obtained is shown generally in FIGURES 22, 22A and 22B. The construction of the master pivot assembly and means by which variable Y motion is obtained is shown in FIGURES 23, 24 and 25. A pair of ears 177 are formed integral with a ring member 410 journaled to rotate relative to a mounting couple member 411 adapted to be attached to one end of the horizontal support 50 by means of screws 178 and locating pins 179 (FIGURES 4 and 5). The ears 177 project substantially beyond the end of the horizontal support and carry stub shafts 180 upon which a frame 181 is journaled by means of ball bearings 182 (FIGURE 24). The shafts 180 have their axis coincident with the pivot 58 of the master arm 51 on the horizontal support 50. The frame 181 forms a part of the stationary part or trunk tube 56 of the master arm 51 and is provided with a pair of parallel spaced apart recesses adapted to receive the vertical tubular guides 185.

Couple member 411 has a tubular end portion 413. Ring member 410 is mounted thereon for rotation by means of bearings 414. An arcuate gear sector 415 is mounted on the top edge of ring 410 with its toothed portion extending beyond the edge of ring 410. A longitudinally extending shaft 416 is journaled in bearings 417 at the opposite ends of a tubular shaft support 418 on the top of the mounting couple member 411. Shaft 416 extends longitudinally relative to the tubular support 50.

Shaft 416 is fitted at one end with a master pinion gear 419 whose teeth mesh with the teeth on the inner surface of gear sector 415. The opposite end of shaft 416 is fitted with a master change gear 420 whose teeth mesh with the teeth of another slave change gear 421 secured to a shaft 422 journaled for rotation in a bracket 423 on the top of the couple member 411. A slave pinion 424 is also mounted on shaft 422 to rotate therewith along with change gear 421. The teeth of slave pinion 424 mesh with the teeth of a bearing support gear 425 which is secured against rotation relative to the master roller mount plate 426, as by means of dowel pins 427, but the tubular support 50 is rotatable relative to the bearing support gear 425 by virtue of bearings 428.

When the master arm trunk tube supported on the stub shafts 180 is moved in the X motion to the left or to the right, the ears 177 and ring 410 rotate relative to the mounting couple member 411 which is secured to the rotatable tubular support 50. The rotation of ring 410 causes corresponding rotation of gear sector 415 whose teeth mesh with master pinion 419. The rotation of master pinion 419 is transmitted through shaft 416 to master change gear 420, which in turn meshes with slave change gear 421. As slave change gear 421 is rotated, slave pinion 424 mounted on the same shaft also rotates. Since the teeth of slave pinion 424 mesh with stationary bearing support gear 425, the entire assembly mounted on the mounting couple member 411 is caused to rotate on the axis of the horizontal support tube 50 and rotate the horizontal support tube.

Thus, the horizontal support tube is rotated in the same direction as the master arm assembly is rotated, but a different distance depending upon the gear ratio of the change gears. In this way variable ratio is introduced to the X motion between the master arm and slave arm which is attached to the opposite end of the horizontal support tube 50 and moves therewith. As an example, in the structure illustrated, when master change gear 420 has 27 teeth and slave change gear 421 has 39 teeth, a 2 to 1 ratio results. When the master change gear has 33 teeth and the slave change gear has 33 teeth, a 1.5 to 1 ratio results.

In order to provide a 1 to 1 ratio, one of the change gears 420 or 421 is removed and screw 429 is turned into the position shown in FIGURE 22B so as to cause ears 177 and ring 410 to rotate directly with the mounting couple member 411 and horizontal tubular support 50.

A rocker member 257 is pivoted by means of ball bearings 255 on hubs 256 between a pair of rocker arm mount brackets 412 on opposite sides of the couple member 411. A pair of counterweight arms 254 and 254a are secured to the rocker hubs 256 to pivot therewith. Counterweights 349 as required are carried at the ends of vertically upstanding arms 254 and 254a. Arm 254a is provided with a bracket 350 to which a link (such as actuator 385, FIGURE 1) is secured for the purpose of imparting the Y motion of the master arm to the rocker. Shafts 282 are carried in the top and bottom portions of the rocker member 257 for the purpose of providing a pivotal connection with the rod ends 278 and 279 of tie rods 280 and 281, respectively, to transmit Y motion to the slave arm.

It will readily be seen that the counterweights 349 assist in counter-balancing the manipulator in Y motion as the arms are moved on their pivots toward and away from the shielding wall.

The pivot assembly frame 181 supports two banks of pulleys, an upper bank 246 and a lower bank 247, each comprised of a plurality of tape pulleys 170 and cable pulleys 171. The upper pulley bank 246 is located near the master arm pivot 58 so that the upper peripheral portions of the pulleys 170 and 171 are approximately tangent to the pivot axis and the shaft 248 mounting the pulley bank lies directly below the pivot axis. The lower pulley bank 247 lies below the upper pulley bank 246 and is carried on shaft 249 which lies directly below shaft 248.

In order to introduce variable ratio into the Y motion an adjustable linkage is provided between the pivot assembly frame 181 of the master arm and arm 254a secured to rocker member 257. A block 430 having a diagonal channel 431 extending therethrough is secured to the left-hand side of the pivot frame 181, as viewed by the operator. An elongated slidable arm 432 is fitted for sliding movement in channel 431. Arm 432 is provided at one end with a projecting pin or stud 352 which is used as a pivotal connection for one end of the Y motion link. Arm 432 is provided with a longitudinal T-slot 433. A pair of T-bolts 434 are held spaced apart in block 430 and fitted to slide in T-slot 433.

The heads of the T-bolts slidably engage slot 433 in the arm 432 and the stems of the T-bolts extend outwardly through suitably spaced holes in the block 430 and are provided with cap nuts 435 to permit loosening of the bolts for adjustment of the arm to vary the Y motion ratio. The slot 433 is closed at one end and a stop in the form of a pin 436 at the opposite end limits the extent of movement of arm 432. Movement of arm 432 varies the location of stud 352 which forms a pivotal connection with the link means for transmitting the back-and-forth movement of the master arm relative to the shielding wall to the slave arm. By varying the location of stud 352 by movement of arm 432 in its channel, variation in the Y motion ratio results.

*Alternative master arm ears and rocker assembly and variable X motion levers.—FIGURES 39, 40, 41 and 42*

An alternative means by which the master arm may be connected to the horizontal support and by which variable ratio X motion may be obtained is shown generally in FIGURES 39 through 42. The structure of ears 177, ring member 410, mounting couple member 411, rocker member 257, counterweight arms 254 and 254a, and counterweights 349 are all as previously described. Ring member 410 is mounted on the tubular end portion 413 of couple member 411 by means of bearings 414. Couple member 411 is secured to the tubular support 50 for rotation therewith. A rearwardly extending reach arm 437 is secured to ring member 410 for movement therewith. A bracket 438 is secured to couple member 411 for movement therewith. Bracket 438 lies substantially in the same plane as the free end of reach arm 437 and this plane is substantially parallel to and spaced just slightly from the wall mounting plate 426.

Reach arm 437 and bracket 438 are connected through an adjustable or variable link system. A pivot arm 439 is mounted on a pivot shaft 440 which extends from the face of mounting plate 426. As best seen in FIGURE 40, pivot shaft 440 is adapted to be secured to the mounting plate at one of three or more sites. A link 441 is pivotally connected at 442 to the end of reach arm 437 and at 443 to one end of pivot arm 439. Another link 444 is pivotally connected at 445 to bracket 438 and at 446 to the opposite end of pivot link 439. Through this linkage system lateral motion of the master arm about the axis of the horizontal support is transmitted through the ears 177 and ring member 410 and arm 437 to bracket 438 and thence to couple member 411 and the horizontal tubular support to which the slave arm is attached at the opposite end.

The ratio between motion in the master arm and corresponding motion in the slave arm depends upon the point along pivot arm 439 at which it pivots. As best seen in FIGURE 40, pivot arm 439 is provided with a plurality of pivot bearings 447, 448 and 449. Bearing 448 is approximately equidistant from the ends of the pivot arm. Bearings 447 and 449 are spaced on opposite sides from bearing 448, but at different intervals. When assembled in the manner of FIGURE 40A, in which the center bearing 448 is mounted on pivot shaft 440, a one-to-one ratio exists between the master and slave arms.

As shown in FIGURE 40B, bearing 449 is fitted on pivot shaft 440a which is located at a site spaced from the site of pivot shaft 440 by the same distance by which bearings 448 and 449 are separated. This configuration results in a 1.5 to 1 ratio. Then, when the pivot arm is turned end for end, as shown in FIGURE 40C, and bearing 447 is mounted on pivot shaft 440b, a 2 to 1 ratio results. Pivot shaft 440b is spaced from the site of pivot shaft 440 by the same distance by which bearings 447 and 448 are spaced apart.

Depending upon the relative locations of the pivot bearings in pivot arm 439 and the pivot shaft 440, almost infinite variation may be introduced to the ratio between the master and slave arm in the X motion. The illustrated structure makes it possible to build the manipulator with several predetermined ratios and change may be made from one to another by the relatively simple adjustment of the linkage system.

*Slave pivot assembly.—FIGURES 6, 7, 26 and 27*

The stationary part or trunk tube 59 of the slave arm is connected to the horizontal tubular support 50 for movement about a pivot 61. The attachment means include a frame structure 116 secured to the upper end of the tubular slave trunk tube 59. Framework 116 includes a pair of vertical side pieces 115 joined together at their top ends by a horizontal cross-piece 120. The stub shafts 108a of the yoke 111 of the horizontal tubular support 50 are journaled in bearings 110 carried by the vertical side pieces 115 of the frame 116. Tie rod 280 is connected to frame 116 through a pin or shaft 286 in the upper part of the frame 116. Tie rod 281 is similarly connected to a shaft 287 below the main slave pivot 61.

The slave arm pivot structure includes a lower bank of pulleys 168 and an upper bank of pulleys 169 each comprised of a plurality of tape pulleys 170 and cable pulleys 171 journaled for rotation on a common axis. The upper pulley bank 169 is mounted on a fixed shaft 172. The lower pulley bank 168 is mounted on a pivot shaft 287 to which tie rod 281 is pivotally connected.

The azimuth cables 135 and 136, elevation and twist motion tapes 76–79, tong tape 175 and Z motion tape 321 extend around the pulleys of the upper bank 169 in their paths from the horizontal support tube, and then over and around the pulleys of the lower bank 168 in their paths downward to the specific mechanisms of the slave arm, as more fully described hereinafter. Z motion tape 304 passes around a pulley 170 of the upper pulley bank 169 in its path from the horizontal support tube 50, but then passes downwardly an anchorage 450 at the top of the slave arm intermediate tube 59A.

Upper pulley bank 169 is mounted so that the upper peripheral portions of the pulleys 170 and 171 are approximately tangent to the pivot axis 61. The lower pulley bank 168 is displaced toward the shielding wall so as to carry the tape and cables along the outside of the trunk tube.

Figure 34:
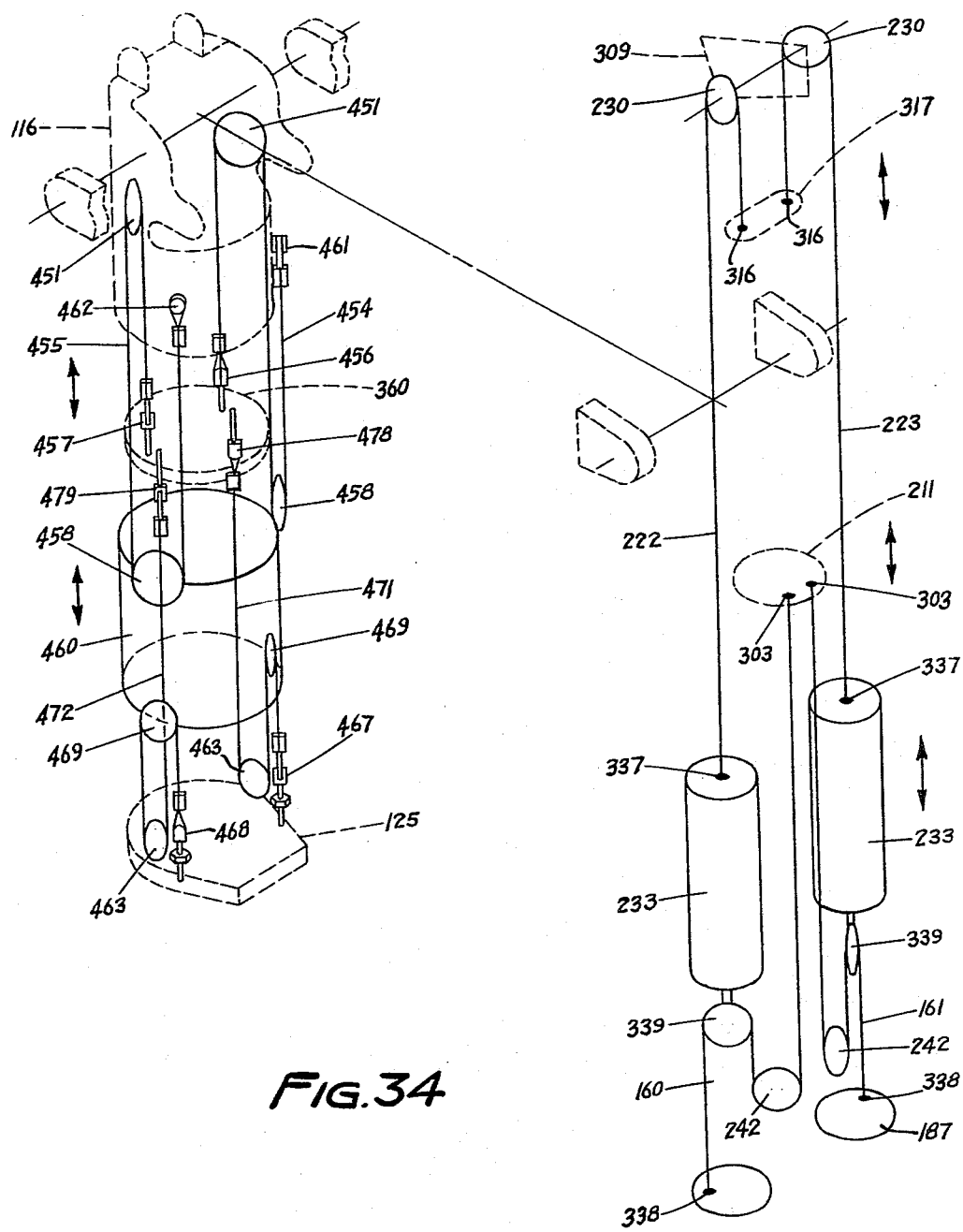
FIGURE 34 is a schematic perspective view showing how the moveable portions of the arms are counterbalanced for vertical movement relative to the stationary portion of the arms.

A pair of counterweight tape guide pulleys 451 are provided, each journaled for rotation about a shaft 452 and each extend through an opening 453 (FIGURE 6) which extends through the vertical side pieces 115 of the slave pivot frame structure 116. As best seen in FIGURE 34, guide pulleys 451 enable the counterweight tapes 454 and 455 to pass in their paths of travel from anchorages 456 and 457, respectively, at the top of the intermediate tube carriage up the inside of slave trunk tube 59 over the pulleys and down the outside of slave trunk tube, to pulleys 458 on the slave counterweight 460 and thence back to anchorages 461 and 462 on the outside of the slave pivot structure 116.

A vertically extending bumper member 463A provided with a resilient tip 464A is mounted in the slave pivot frame 116 in the path of the intermediate tube carriage 360 to function as a stop for the intermediate tube assembly.

*Slave counterweight assembly.—FIGURES 6 and 7*

The slave arm is counterweighted independently of the master arm. A relatively heavy tubular counterweight member 460 is adapted to be fit around the outside surface of the slave trunk tube 59 and be movable longitudinally relative to the trunk tube. The slave counterweight 460 is provided with a pair of upper guide pulleys 458 positioned on opposite sides of the tubular counterweight member. Each pulley 458 is journaled on a shaft 459. Pulleys 458 guide counterweight tapes 454 and 455 in their paths between anchorages on the slave pivot frame 116 and at the top of the intermediate tube carriage 360, as illustrated schematically in FIGURE 34 and described in detail elsewhere. The counterweight assembly 460 is also provided with a pair of lower guide pulleys 469 each journaled on a shaft 470 and positioned on opposite sides of the counterweight assembly to guide counterweight tapes 471 and 472 in their paths between anchorages at the top of the intermediate tube carriage 360 and the slave azimuth bracket 125, as illustrated in FIGURE 34 and described in detail elsewhere.

The outer surface of slave trunk tube 59 is provided on each side with an elongated longitudinal projecting track or guide 473. The counterweight assembly 460 is provided with a plurality of guide rollers 474 spaced at the upper and lower edges of the counterweight assembly and on its opposite sides to engage track 473 so as to prevent relative rotation between the counterweight and the slave trunk while permitting relative longitudinal movement. A further set of guide rollers 475 at the top and bottom of the counterweight assembly engage the outer surface of slave trunk tube 59 to facilitate longitudinal movement of the counterweight. A resilient bumper 476 at the top of the counterweight cushions contact between the counterweight and the slave pivot frame 116.

*Slave azimuth assembly.—FIGURES 6, 7, 28, 29 and 30*

A slave azimuth body in the form of a bracket 125 is secured to the lower end of the slave trunk tube 59. A rotating body or ring 127 is rotatably mounted within the bracket 125 by means of a bearing 128. The lower end of the ring 127 provides mountings for shafts 143 which carry rollers 144 and 144a. The rollers 144 engages the outside surfaces of tube 355 of intermediate tube assembly 59A and roller 144a engages the groove 356 formed in the tube 355 to cause ring 127 to rotate with the intermediate tube assembly. The roller 144a constitutes a means for keying the slave arm boom tube 60 to the ring 127 through intermediate tube 59A whereby a rotational movement of the boom tube 60 with respect to the ring 127 is prevented while axial movement of the boom tube with respect to the ring is permitted.

The slave azimuth body is provided with a cable take-up member in the form of a double grooved pulley 133 which receives azimuth motion cables 135 and 136 whose ends are secured by anchoring to the pulley and whose opposite ends extend to the master azimuth assembly. Pulley 133 is mounted on ring 127 to rotate therewith.

Cables 135 and 136 are wrapped around the double grooved pulley in opposite directions. As one cable is wrapped about the pulley in the operation of the manipulator, the other is unwrapped. This movement of the cables causes rotation of the rotary ring member 127 and, through the keying roller 144a, causes rotation of the intermediate tube 59A and the slave arm boom tube and the wrist joint and tong assemblies at the end thereof. Cables 135 and 136 are moved in response to corresponding movement of the master arm azimuth assembly and transmit the rotary motion of the master arm about its longitudinal axis to produce a corresponding rotation of the slave arm about its longitudinal axis.

Cables 135 and 136 whose ends are anchored in the double grooved pulley 133 pass over grooved guide pulleys 141 and then upward toward the pulley banks associated with the pivot 61 of the slave arm on the horizontal support.

The elevation and twist motion tapes 76–79 and tong tape 175 from the slave pivot pulley banks run over pulleys 357 which are journaled to rotate on shaft 358 mounted in the bracket. Bank of pulleys 357 are mounted so as to pass the tapes from outside of the slave arm trunk tube to the intermediate slave tube assembly telescoped within the trunk tube. A further pulley 359 is mounted on shaft 358 to guide Z motion tape 321 from the outside of the slave arm trunk tube in its passage from the slave pivot pulley banks to the slave intermediate tube.

A further pair of guide pulleys 463, each journaled on a shaft 464 supported on a bracket 465 on the slave azimuth bracket 125, is provided on opposite sides of the slave azimuth assembly. These guide pulleys guide counterweight tapes 471 and 472 in their paths between anchorages at the top of the intermediate tube carriage 360 to lower counterweight guide pulleys 469 and thence to anchorages 467 and 468, respectively, each secured to the guide pulley brackets 465. Guide pulleys 463 are positioned in openings 466 in the slave trunk tube wall in order to guide the counterweight tapes from the inside of the trunk tube to the outside for their passage to the counterweight guide pulleys and back to their anchorages on the slave azimuth bracket.

*Slave arm intermediate tube.—FIGURES 6, 7, 31, 32 and 33*

Slave arm intermediate tube 59A is telescoped within trunk tube 59 and is movable with respect to the trunk tube, both along and rotationally about the longitudinal axis of the slave arm. The intermediate tube assembly includes a relatively elongated hollow tube 355 having a carriage body 360 at its top end and a guide bracket 361 mounted at its bottom end. Body 360 is journaled for rotation with respect to tube 355 by means of a bearing 362 held in an adapter and retainer member 363 at the top of tube 355.

The guide bracket 360 is provided with a plurality of rollers 364 each journaled for rotation on a shaft 365. Rollers 364 bear against the inner wall of slave arm trunk tube 59 and guide the intermediate tube in its vertical movement. Guide bracket 360 also carries a plurality of pulleys 366 mounted for rotation about shaft 367 for guiding elevation and twist motion tapes 76–79 and tong tape 175 in their paths between the slave azimuth assembly and the slave wrist joint.

A track roller 370 is journaled in the carriage body to rotate on shaft 371. Track roller 370 is positioned on the opposite side of the carriage from the bank of pulleys and engages a vertical track 372 (FIGURE 6) on the inside of the slave trunk tube 59 for the purpose of preventing rotation of the intermedate tube carriage body 360 relative to the slave trunk tube. The remainder of the intermediate tube assembly may rotate in bearing 362 in response to movement of the rotatable ring member 127 of the slave azimuth assembly (in response to movement of the azimuth cables) to reproduce motions of the master arm in the slave arm.

The guide bracket 361 is secured for both vertical and rotational movement with the intermediate tube assembly. The guide bracket is in the form of a ring. A plurality of rollers 373 each mounted for rotation about a shaft 374 are provided about the inner periphery of the guide bracket to bear against the outer surface of the slave arm boom tube 60 to assist in guiding it in its vertical movement relative to the remainder of the slave arm. A guide pulley 375 is journaled for rotation on shaft 376 on the bottom guide bracket 361. The peripheries of the pulley 375 extend through the guide bracket so as to pass a Z motion cable 377 around the end of the intermediate tube wall in the passage of that cable from its anchorage 378 at the top of the slave arm boom tube to its other anchorage 379 in the slave arm azimuth assembly.

A pair of tape anchorages 456 and 457 are provided, respectively, for counterweight tapes 454 and 455, the opposite ends of which are anchored on the slave pivot frame 116. A further tape anchorage 477 is provided for Z motion tape 304. In FIGURE 7 there is shown a depending anchorage 369 for Z motion tape 321 and a pair of depending anchorages 478 and 479 for slave counterweight tapes 471 and 472, respectively.

The upper end of the slave boom tube 60 is fitted with a carriage 380 secured thereto (FIGURE 7). Boom tube carriage 380 is provided with a plurality of guide rollers 381 which bear against the inner surface of the intermediate tube and a track roller 382 which engages vertical track 383 on the inside of the intermediate tube. Engagement of track 383 by track roller 382 assures that the slave arm boom tube 60 will be rotated about the longitudinal axis of the slave arm along with the intermediate tube assembly while permitting relative vertical movement of the boom tube with respect to the intermediate tube.

*Master and slave counterbalance schematic.— FIGURE 34*

In order that the master arm boom tube will remain in any position relative to the master trunk and may be retracted or extended with minimum exertion on the part of the operator, it is counterbalanced, as shown schematically in FIGURE 34. At the same time, the length of the paths of travel of tapes and cables associated with the master arm boom tube and moved with that tube is maintained uniform by compensating for the distance through which the boom tube is moved by means of the half-speed carriage assembly.

Figure 36:
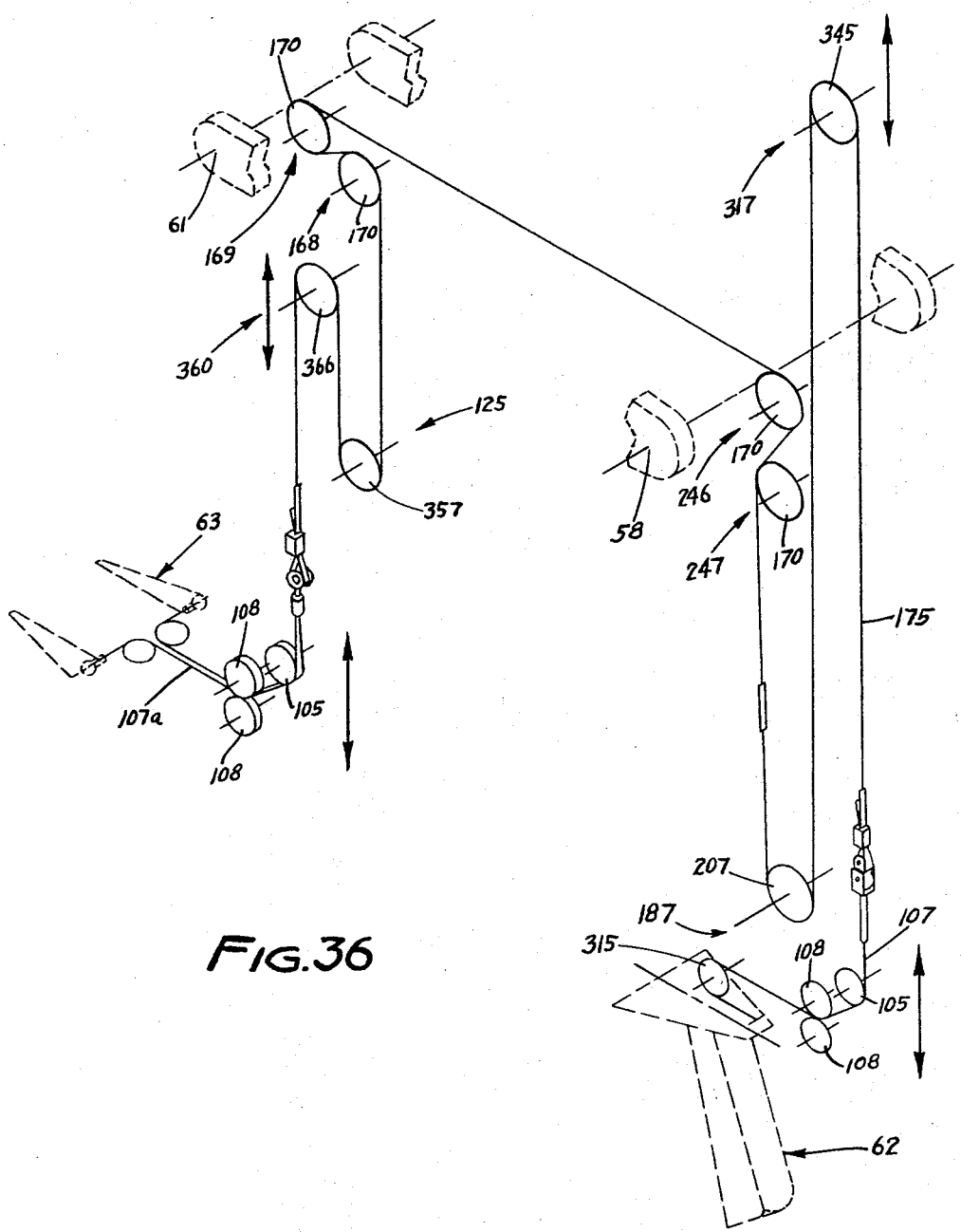
FIGURE 36 is a schematic perspective view showing how manipulation of the handle on the master arm causes opening and closing of the tongs carrier by the slave arm.
Figure 38:
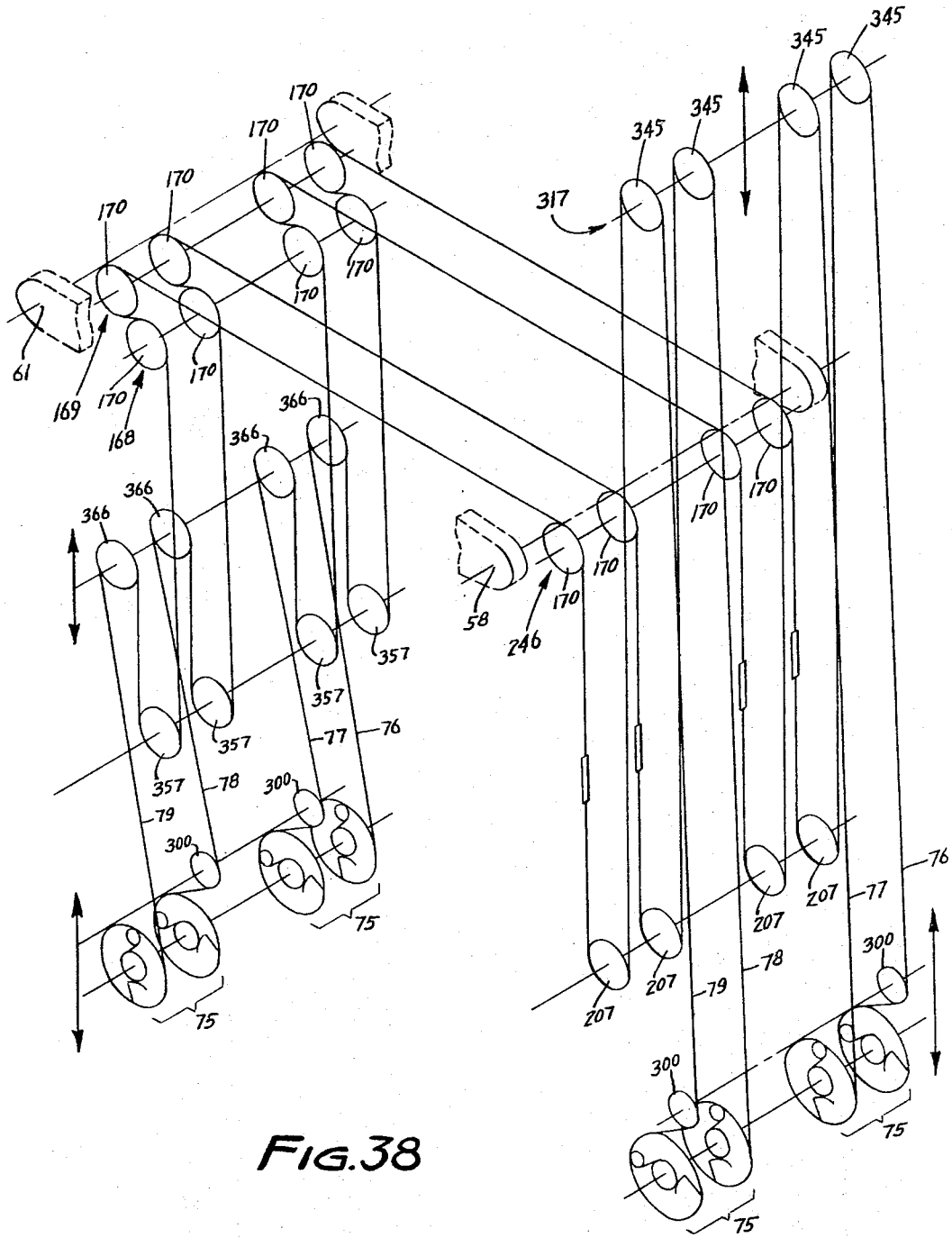
FIGURE 38 is a schematic perspective view showing elevation and twist means by which rotation of the handle carried by the master arm about its own two axes produces corresponding rotation of the tongs on the slave arm.
Figure 41:
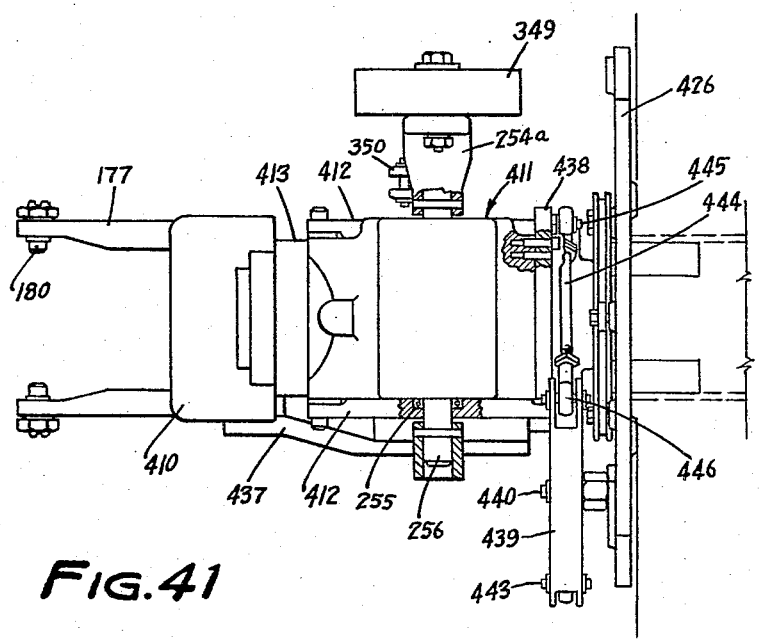
FIGURE 41 is a top plan view of the master pivot ears and rocker assembly of FIGURE 39.
Figure 42:
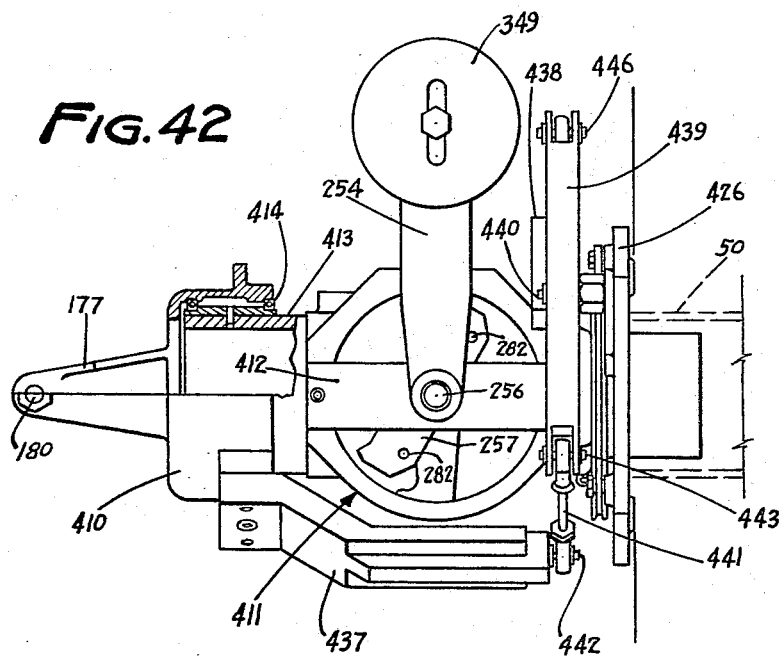
FIGURE 42 is an elevation, partly in section, of the master pivot ears and rocker assembly of FIGURE 39.

Counterweights 233 are suspended within tubular guides 185 by means of tapes 222 and 223 which pass over fixed pulleys 230 in the counterweight bracket assembly at the top of the master arm trunk tube. The ends of tapes 222 and 223 are secured in anchorages at 316 in the half-speed carriage assembly 317, which moves longitudinally between the tubular guides 185 of the master arm trunk tube in the same direction but at one-half the speed of the master arm boom tube. Tapes 160 and 161 are attached at anchorages 303 at the top of the master arm boom tube for longitudinal movement therewith. Tapes 160 and 161 extend downwardly and around fixed pulleys 242 on the master azimuth assembly at the bottom end of the master arm trunk tube. Tapes 160 and 161 then extend upwardly and around pulleys 339 fixed to the counterweights 233 and downwardly again where their opposite ends are fixed at anchorages 338 in the master azimuth bracket. Elevation and twist tapes 76-79 and tong tape 175 all extend over the half-speed carriage pulley bank in their paths between the fixed handle end of the boom tube and the fixed upper pivot pulley bank (FIGURES 36 and 38). These tapes provide the counterforce which enables the half-speed carriage to remain suspended in the upper portion of the trunk tube.

As the boom tube is lowered, that is, extended out of the trunk tube, it moves at a given rate with respect to the fixed trunk tube. At the same time, the half speed carriage 317 moves in the same direction but at one-half the speed and over one-half the distance. The counterweights 233 which travel in the tubular guides of the trunk tube, move in the opposite direction and at one-half the rate of speed of movement of the boom tube.

The slave arm is independently counterbalanced, as also shown in FIGURE 34. The length of the path of travel of the tapes and cables associated with the slave arm boom tube and moved with that tube is maintained uniform by compensating for the distance through which the boom tube is moved by means of the intermediate tube assembly, which functions as a half speed carriage.

Counterweight 460 is suspended around the outside of slave trunk tube 59 from the slave pivot frame 116 for longitudinal movement along the slave trunk tube. Counterweight tapes 454 and 455 are anchored on studs 461 and 462, respectively, located on the outside of the slave pivot frame 116. Tapes 454 and 455 then extend down along the outside of the slave trunk tube to upper guide pulleys 458 carried on opposite side of the counterweight 460. The tapes 454 and 455 extend around the upper guide pulleys 458 and up along the outside of the slave trunk tube to guide pulleys 451 journaled in the slave pivot frame.

Guide pulleys 451 extend through openings in the side wall of the slave pivot frame in order to pass the tapes 454 and 455 to the inside of the slave trunk tube for their passage to anchorages 456 and 457, respectively, in the top member 360 of the intermediate tube carriage. Thus, it will be seen that, as force is exerted upon counterweight tapes 454 and 455 by the lowering of the slave boom tube and slave intermediate carriage, this force is transmitted by the tapes to raise the counterweight 460 along the outside of the slave trunk tube.

When the slave boom tube and intermediate carriage are moved in the opposite direction force is exerted upon counterweight tapes 471 and 472 to move the counterweight 460 in the opposite direction. The opposite ends of tapes 471 and 472 are secured to anchorages 478 and 479, respectively, depending from the top member 360 of the intermediate tube carriage. Tapes 471 and 472 extend down through the annular space between the intermediate tube and slave trunk tube to guide pulleys 463 journaled on the slave azimuth bracket 126 and positioned in openings in the slave trunk tube wall in order to pass the tapes through that wall.

From guide pulleys 463 the tapes 471 and 472 extend outwardly along the outside of the slave trunk tube to the lower guide pulleys 469 carried on opposite sides of the counterweight 460, and thence extend downwardly along the outside of the slave trunk tube to anchorages 467 and 468, respectively, which are carried by the slave azimuth bracket. It will be seen that the counterweight 460 is positively moved longitudinally of the slave trunk tube in the opposite direction from movement of the slave boom tube and slave intermediate tube in order to maintain the balance of the slave arm.

Figure 35:
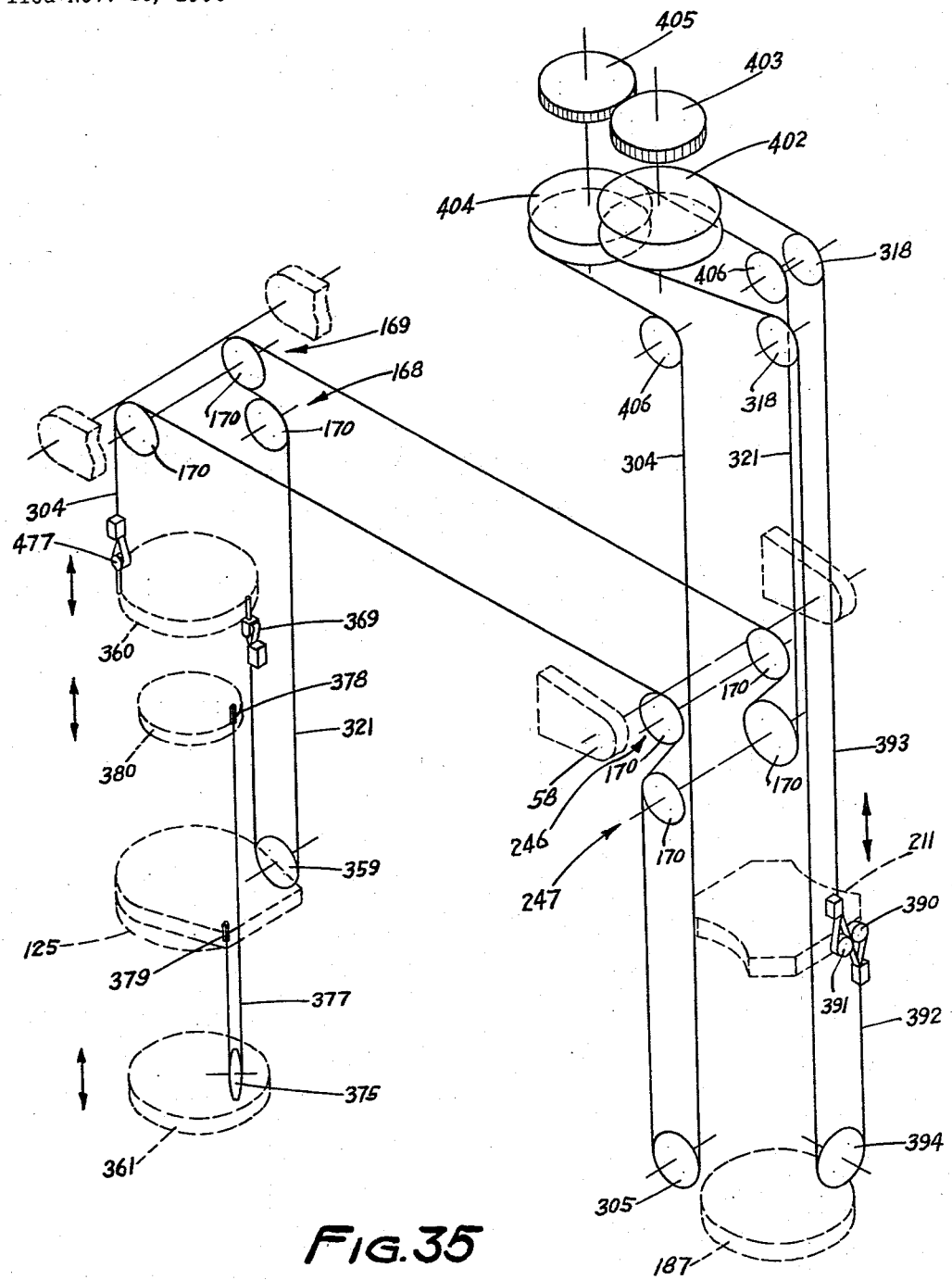
FIGURE 35 is a schematic perspective view showing how vertical movement of the master arm handle produces a corresponding vertical movement (or "Z" motion) of the same or different magnitude in the tong at the end of the slave arm.

*Variable Z motion schematic.—FIGURE 35*

The transfer of the extending and retracting movement or Z motion of the master boom tube in a variable ratio to the slave boom tube is simultaneous with, but independent of, movement of the counterbalance systems. As the master boom tube is pulled downwardly from the master trunk assembly by the handle means, force is exerted upon master Z motion tape 393 which is anchored to stud 391 in the top member 211 of the master boom tube. Force is transmitted through tape 393 over guide pulley 318 in the counterweight assembly at the top of the master trunk tube assembly to the double grooved master tape drum 402 and causes that drum to rotate and the tape to unwind from the upper groove of that drum.

As drum 402 is rotated to unwind tape 393, master Z motion tape 392 which is wound around the drum in the opposite direction is wound further onto the drum. This winding force exerted on tape 392 is transmitted over guide pulley 318, through the tape which extends down and around guide pulley 394 located on the master azimuth bracket, and thence up to its anchorage at stud 390 on the top member 211 of the master boom tube. Thus, any slack in tape 392 caused by lowering of the master boom tube is taken up as that tape is wound further about the lower groove of the double grooved tape drum 402.

Because the master change gear 403 is mounted to rotate with the master tape drum 402, as drum 402 is rotated the master change gear 403 causes the slave change gear 405 to be rotated in the opposite direction at a rate determined by the gear ratio. Slave change gear 405 is mounted on the same shaft to rotate with the double grooved slave tape drum 404 mounted in the counterweight assembly at the top of the trunk tube assembly. One slave Z motion tape 304 extends from an anchorage in the lower groove of double grooved tape drum 404 in one direction around the drum. From drum 404 tape 304 extends over guide pulley 406 at the top of the master trunk tube, downwardly over fixed guide pulley 305 carried by the azimuth assembly at the bottom end of the master arm trunk. Tape 304 then passes upwardly past pulley 170 of the lower master pivot pulley bank 247 and over pulley 170 of the upper pivot pulley bank 246, through horizontal support 50 to pulley 170 of the upper slave pivot pulley bank 169 and down to an anchorage 477 fixed in the carriage 360 of the slave arm intermediate tube.

Another slave Z motion tape 321 is secured at 360 to the carriage 360 of the slave arm intermediate tube. Tape 321 extends downwardly and is guided over an idler 359 in the slave azimuth bracket and then upwardly around the pulleys 170 of the lower slave pivot pulley bank 168 and upper slave pivot pulley bank 169. From the slave pivot pulleys, tape 321 extends through horizontal support 50 to the master pivot pulleys, passing over pulley 170 of the upper bank 246, down and around pulley 170 of the lower bank 247, upwardly to pulley 406 fixed in the master arm counterweight assembly and thence around the upper groove of drum 404, in the opposite direction from tape 304, to an anchorage in the drum. This arrangement of tape 321 insures positive outward extension of the slave arm intermediate tube and slave boom tube regardless of the position of the slave arm relative to true vertical.

It will be seen that tapes 392 and 393 form one closed loop through the anchorages on drum 402 and boom tube head 211. Similarly, tapes 304 and 321 form an independent closed loop through the anchorages on drum 404 and intermediate tube carriage 360. Both loops transmit forces in both directions. Each loop is preloaded by tensioning the tapes before they are finally clamped in place. In this pre-loaded condition, both sides of the tape loops help carry the load.

As the master boom tube is lowered, that is extended from the trunk, this motion is transmitted through tapes 392 and 393 and, through the action of the change gears and tape drums, to tapes 304 and 321 through the horizontal support to the slave arm. As the master boom tube is lowered the slave intermediate tube is extended as a result of the forces transmitted by a distance related in a predetermined ratio to the movement of the master boom tube. As the slave intermediate tube is extended from the slave trunk tube in which it is telescoped, the slave boom tube is extended at the same time from the slave intermediate tube in which it is telescoped.

The slave boom tube is tied to the slave intermediate tube for downward movement in the Z motion by means of cable 377, one end of which is anchored at the top of the slave boom tube at 378 and the other end of which is anchored to the slave azimuth bracket at 379 after passing around pulley 375 in the carriage at the bottom of the slave intermediate tube. Thus, as the intermediate tube is extended, force is exerted by means of pulley 375 on cable 377. This force is transmitted through the cable 377 to the top of the slave boom tube pulling it downwardly and causing the boom tube to be extended relative to the intermediate tube.

The wrist tapes 76–79 (shown schematically in FIGURE 38) comprise a further component of the Z motion transmission means. The slave tapes pass over the upper pulleys 366 of the intermediate tube and under the bank of pulleys 357 at the lower end of the slave trunk tube (fixed to the azimuth assembly) and thence over the slave pivot pulley banks 168 and 169 to the master side. The slave boom tube is moved upwardly (retracted into the intermediate tube) by the force transmitted by the wrist tapes.

The extent of movement of the slave boom tube is twice that of the slave intermediate tube relative to the fixed slave boom tube and varies depending upon the predetermined ratio of the change gears from that of the master boom tube. That is, the combined extension of the slave intermediate tube and slave boom tube varies from that of the master boom tube according to the preselected variable ratio. It will be observed that the slave boom tube will travel twice as fast as the intermediate tube relative to the slave trunk tube.

*Tong motion schematic.—FIGURE 36*

As shown schematically in FIGURE 36, the squeezing motion of the operator on the handle means 62 of the master arm is transmitted to the tong means 63 on the slave arm. As fully described in the aforementioned Goertz et al. United States Patent No. 2,695,715, squeezing of the handle 62 through direct linkage exerts tension from cable 107 on tape 175 which is transmitted through the tape. Tape 175 passes over pulley 345 carried in the half-speed carriage assembly 317 (which is movable between the tubular guides 186 of the master arm trunk tube), down and around pulley 207 (whose location is fixed as part of the master azimuth assembly), up and over pulleys 170 (in the master arm pivot pulley banks) through horizontal support 50. From the horizontal support the tape 175 passes over pulleys 170 of the upper and lower slave arm pivot pulley banks and down and around a pulley 357 (located in the azimuth assembly of the slave arm trunk tube). Tape 175 then passes up and over pulley 366 supported in the slave arm intermediate tube (half-speed) carriage, and, thence, downwardly to the tong mechanism 63 at the end of the slave arm boom tube. Through direct linkage, as disclosed in the aforementioned Goertz et al. patent, the tension transmitted by tape 175 to cables 107a causes the tong elements to move in order to grasp an object to be acted upon. Spring means in the tong assembly open the tongs upon release of tension from the handle.

Figure 37:
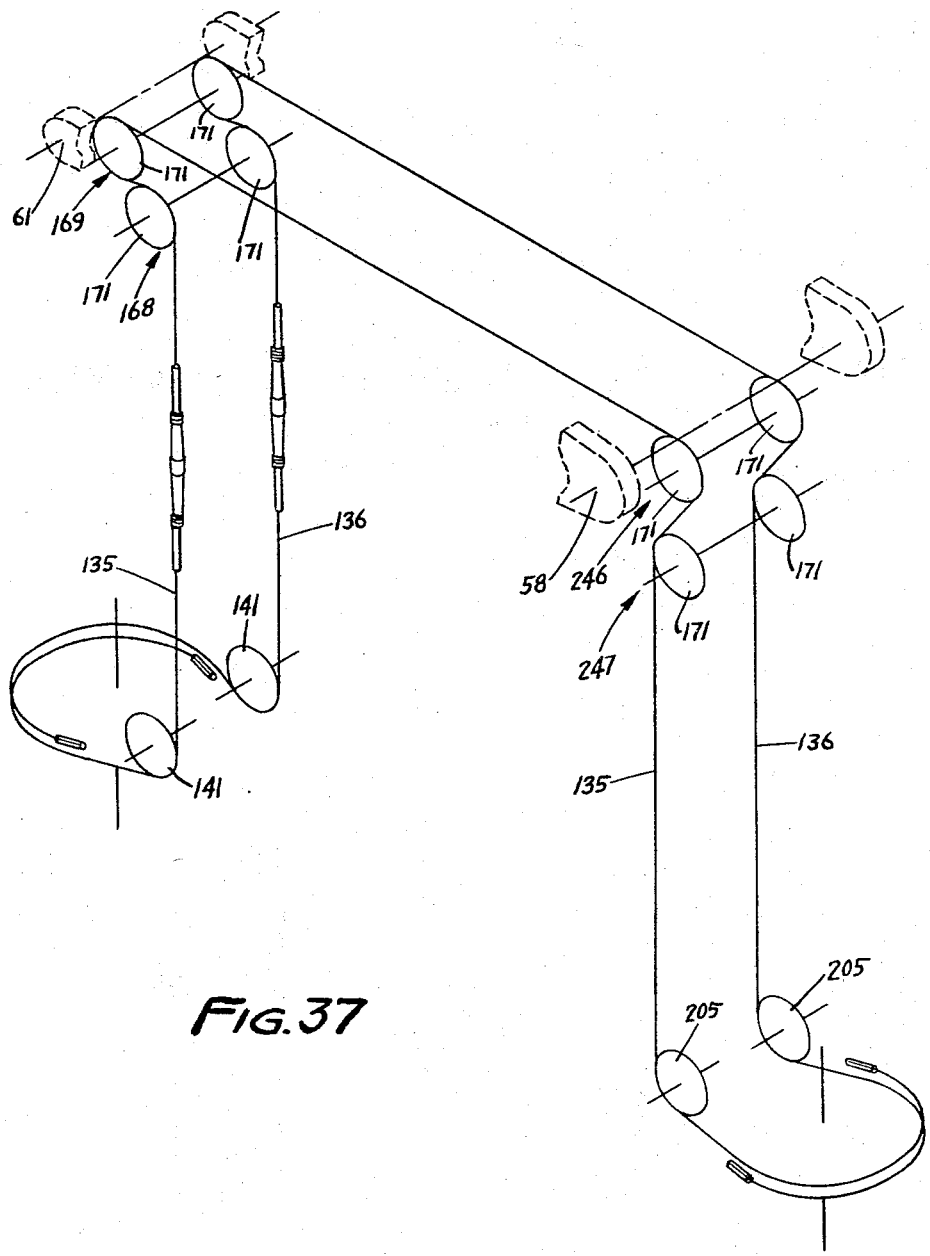
FIGURE 37 is a schematic perspective view showing azimuth means by which rotation of the handle about the longitudinal axis of the master arm produces a corresponding rotation of the tongs about the longitudinal axis of the slave arm.

*Azimuth motion schematic.—FIGURE 37*

In FIGURE 37 there is shown schematically the manner in which rotation of the master arm boom tube about its longitudinal axis causes corresponding rotation of the slave arm boom tube and intermediate tube. As the handle member 62 is moved in an arc about the longitudinal axis of the master arm this motion is transmitted through the wrist joint to the master arm boom tube 57. Because the master arm boom tube 57 is keyed against rotation relative to the ring 190 of the master azimuth assembly by virtue of the keying rollers 199, rotation of the master arm boom tube causes corresponding rotation of the ring 190 which carries the double grooved pulley 202. The cables 135 and 136 are wrapped about that pulley in opposite directions. Thus, as pulley 202 is rotated in a right-to-left direction, as viewed by the operator, tension is exerted on cable 136 as it is caused to wind farther onto the pulley. This tension is transmitted by the cable in its path up and over guide pulley 205, up and around guide pulleys 171 of the lower and upper pivot pulley banks of the master arm, through the horizontal support, around the corresponding guide pulleys 171 of the upper and lower pivot pulley banks of the slave arm and down to double grooved pulley 133 of the slave azimuth assembly where the tension on the tape caused rotation of the pulley.

The rotation of the double grooved pulley 133 is in a right-to-left direction, as viewed by the operator, and, thus, causes an unwinding of tape 136 from double grooved pulley 133. This causes a corresponding winding of tape 135 about the pulley which exerts tension on that tape which is transmitted along the tape in its path up the slave arm, around the guide pulleys, through the horizontal support, around the guide pulleys and down to the master azimuth assembly where the opposite end of the tape is unwound the corresponding amount from the double grooved pulley 202. The rotation of pulley 133 causes rotation of the slave azimuth ring member 127 intermediate tube 59A and slave arm boom tube 60.

*Elevation and twist motion schematic.—FIGURE 38*

The system by which elevation and twist motions are transmitted from the handle 62 to the tong 63 is illustrated schematically in FIGURE 38. One end of tape 76 is secured to take-up means 75 associated with the wrist joint and handle mechanism, which is rotated in response to manipulation of the handle by the operator through direct gearing, as described in the aforesaid Goertz et al. United States Patent 2, 695,715.

As take-up means 75 is rotated in a counterclockwise direction, as viewed in FIGURE 38, tape 76 is wound about that drum. This exerts tension upon the tape which is transmitted through the tape in its path up and over pulleys 345 (in the half-speed carriage 317), down and around pulley 207 (located in the master azimuth bracket at the bottom end of the trunk tube), up and around pulley 170 (located in the upper master pivot pulley bank) and thence through the horizontal support.

From the horizontal support tape 76 extends over and around pulleys 170 of the upper and lower slave pulley banks, down and around pulley 357 in the azimuth assembly at the lower end of the slave arm trunk tube, up and over pulley 366 on the slave arm intermediate tube (half-speed) carriage 360 and thence, down to drum 75 of the slave arm wrist joint mechanism to which the end is secured. The force transmitted by tape 76 causes drum 75 to be rotated in a counterclockwise direction corresponding to rate and extent of rotation to the rotation of drum 75 on the master arm.

Tape 77 extends around drum 75 of the slave wrist joint in the opposite direction from tape 76. The end of tape 77 is attached to the drum. Thus, when drum 75 is rotated in a counterclockwise direction (caused by the unwinding of tape 76) tension is exerted by the drum 75 on tape 77 to wind that tape further onto drum 75. This force is transmitted by the tape along its path of travel up and over pulley 366 on the intermediate tube (half-speed) carriage 360, down and under pulley 357 (located in the slave azimuth assembly), up and over pivot pulleys 170 and through the horizontal support.

From the horizontal support the force is exerted through the tape along its path over pulley 170 in the upper master pivot pulley bank, down and around pulley 207 in the master trunk tube azimuth assembly, up and over half-speed carriage pulley 345 to drum 75 of the master arm wrist joint to which the end of tape 77 is wrapped in the opposite direction and is secured. As drum 75 rotates in a counterclockwise direction to wind tape 76 onto it, tape 77 is unwound to the same extent.

The tapes 79 and 78 follow similar paths and function similarly to tapes 76 and 77. The motions of the operator in moving the handle means about the axes of rotation of trunnions 95 and shaft 97 are reproduced in the tong means of the slave arm.

Each of the motion systems has been described in connection with the schematic illustrations as moving in a single direction. The operation of the systems to accomplish movement in the opposite direction will be readily apparent. It will also be apparent that, in actual operation of the manipulator device, two or more of the motion systems will be in simultaneous but independent operation.

The manipulator of this invention is characterized by the advantageous maintenance of balance for all indexing possibilities and variable ratio drives. For example, slave counterweight 460 independently balances the slave arm in Z motion. Counterweight 349 independently balances the slave arm in X and Y motions. The master arm is also independently balanced by counterweights 233 for Z motion and counterweight 311 for X and Y motions. Balance is maintained in all configurations of indexing independent of the motion coupling ratios and there is completely independent balancing of master and slave arms.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A remote-control through-the-wall master-slave manipulator comprising a horizontal support adapted for insertion through a barrier wall and rotation about its longitudinal axis, a master arm having a relatively stationary portion pivotally connected to one end of said support and a slave arm having a relatively stationary portion pivotally connected to the other end of said support, the relatively stationary portions of said master arm and slave arm being movable relative to said horizontal support on their pivotal connections and movable with said horizontal support about its longitudinal axis, but stationary as to movement transverse to the longitudinal axis of said horizontal support, a longitudinally extensible portion on said master arm and a longitudinally extensible portion on said slave arm movable in response to movement of the extensible portion of the master arm, said slave arm being movable in response to corresponding movement of said master arm in its movement relative to the horizontal support and with the horizontal support and in the movement of the extensible portion relative to the stationary portion, structural means interconnecting said master arm and slave arm for moving said slave arm simultaneously in direct coordination with said master arm but at a different rate and over a different distance from corresponding movement of said master arm.

2. A manipulator according to claim 1 further characterized in that said slave arm is movable with said master arm about the longitudinal axis of said horizontal support at a different rate and over a different distance from corresponding movement of said master arm.

3. A manipulator according to claim 1 further characterized in that said slave arm is movable on its pivotal connection to one end of said horizontal support in response to movement of said master arm but at a different rate and over a different distance from corresponding movement of said master arm.

4. A manipulator according to claim 1 further characterized in that the lower end of the extensible portion of said master arm is provided with handle means and the lower end of the extensible portion of said slave arm is provided with grasping means movable in response to manipulation of said handle means, said grasping means is extensible from the stationary portion of said slave arm in response to movement of the handle means of the master arm but at a different rate and over a different distance from corresponding movement of said handle means.

5. A manipulator according to claim 2 further characterized in that one portion of said horizontal support to which said stationary portion of said master arm is pivotally connected is rotatable about the longitudinal axis of said horizontal support relative to the portion of said horizontal support to which said relatively stationary portion of said slave arm is pivotally connected and said relatively rotatable portions of said horizontal support are connected together for rotation together but at different rates and over different distances.

6. A manipulator according to claim 5 further characterized in that said relatively rotatable portions of said horizontal support are interconnected through a gear train, the ratio of the gears of which determines the variable motion ratio between said master arm and slave arm.

7. A manipulator according to claim 6 further characterized in that said horizontal support is journaled in a stationary mounting, said gear train includes a first gear member adapted to be rotated with the master arm portion of said horizontal support, a master pinion engaged by said first gear member and mounted on the slave arm portion of said horizontal support, a master change gear rotatable with said master pinion and engaging a slave change gear, a slave pinion rotatable with said slave change gear and engaging a stationary gear member mounted on the stationary mounting for said horizontal support, said horizontal support being rotatable relative to said stationary gear member.

8. A manipulator according to claim 5 further characterized in that said relatively rotatable portions of said horizontal support are interconnected through adjustable pivot lever means, the pivot axis of which determines the variable motion ratio between said master arm and slave arm.

9. A manipulator according to claim 8 further characterized in that said horizontal support is journaled in a stationary mounting, said pivot lever means includes a pivot arm, a pivot shaft for that arm mounted on the stationary mounting for said horizontal support, a link extending from one end of said arm to the master arm portion of said horizontal support and pivotally connected to each, a further link extending from the other end of said arm to the slave arm portion of said horizontal support and pivotally connected to each, said pivot arm being provided with a plurality of separate journal means for mounting on said pivot shaft and said stationary mounting being provided with a plurality of separate mounting means for attachment of said pivot shaft.

10. A manipulator according to claim 3 further characterized in that a pair of vertically spaced parallel links extend through said horizontal support, said links being disposed above and below the pivot axes of the stationary portions of said master arm and slave arm pivotally connected to said horizontal support, one end of each of said links being connected to the stationary portion of said slave arm, the other end of each of said links being connected to a rocker member pivotally mounted in the master arm end of said horizontal support on an axis parallel to the pivot axis of the slave arm, said rocker member being connected to the stationary portion of said master arm for pivotal movement therewith by adjustable link means whereby the ratio of pivotal motion between the master arm and slave arm may be varied.

11. A manipulator according to claim 10 further characterized in that said adjustable link means between said rocker member and stationary portion of the master arm comprises a first lever member connected to rotate with said rocker member in a plane perpendicular to the pivot axis of said rocker member, a second lever member connected to the stationary portion of said master arm to rotate with the master arm in a plane perpendicular to the pivot axis of the master arm, a link pivotally connected to each of said first and second lever members, one of said lever members being adjustable as to length whereby the effective length of that lever member between its pivotal connection with said last mentioned link and its own pivot axis may be varied.

12. A manipulator according to claim 11 further characterized in that each of said lever members is an arm, the arm connected to the stationary portion of the master arm is slidably supported relative to the master arm and fastening means are provided to secure that slidable arm at any predetermined location along its length.

13. A manipulator according to claim 4 further characterized in that the extensible portions of said master arm and slave arm are interconnected with each other by means of a plurality of elongated flexible linear motion transmission members whereby extension of the extensible portion of said master arm causes extension of the extensible portion of said slave arm, one end of each of said master arm linear motion transmission members being connected to the extensible portion of said master arm, the other end of each of said master arm linear motion transmission members being connected to a master arm rotary take-up means, one end of each of said slave arm linear motion transmission members being connected to the extensible portion of the slave arm, the other end of each of said slave arm linear motion transmission members being connected to a slave arm rotary take-up means, said rotary take-up means being interconnected for rotation together, the means interconnecting the take-up means being variable whereby the ratio of rotation between the rotary take-up means may be varied.

14. A manipulator according to claim 13 further characterized in that said linear motion transmission members are metal tapes, said rotary take-up means are drums and said tapes are wrapped about said drums in opposite directions, said drums are mounted on parallel shafts for rotation therewith and meshing gears are mounted on said shafts, the ratio of said gears determining the ratio of movement between the extensible portions of said master arm and slave arms.

15. A manipulator according to claim 1 further characterized in that one portion of said horizontal support to which said stationary portion of said master arm is pivotally connected is rotatable about the longitudinal axis of said horizontal support relative to the portion of said horizontal support to which said relatively stationary portion of said slave arm is pivotally connected and said relatively rotatable portions of said horizontal support are connected together for rotation together at different rates and over different distances, and in that a pair of vertically spaced parallel links extend through said horizontal support, said links being disposed above and below the pivot axes of the stationary portions of said master arm and slave arm pivotally connected to said horizontal support, one end of each of said links being connected to the stationary portion of said slave arm, the other end of each of said links being connected to a rocker member pivotally mounted in the master arm end of said horizontal support on an axis parallel to the pivot axis of the slave arm, said rocker member being connected to the stationary portion of said master arm for pivotal movement therewith by adjustable link means whereby the ratio of pivotal motion between the master arm and slave arm relative to the horizontal support may be varied.

16. A manipulator according to claim 1 further characterized in that one portion of said horizontal support to which said stationary portion of said master arm is pivotally connected is rotatable about the longitudinal axis of said horizontal support relative to the portion of said horizontal support to which said relatively stationary portion of said slave arm is pivotally connected and said relatively rotatable portions of said horizontal support are connected together for rotation together at different rates and over different distances, and in that the extensible portions of said master arm and slave arm are interconnected with each other by means of a plurality of elongated flexible linear motion transmission members whereby extension of the extensible portion of said master arm causes extension of the extensible portion of said slave arm, one end of each of said master arm linear motion transmission members being connected to the extensible portion of said master arm, the other end of each of said master arm linear motion transmission members being connected to a master arm rotary take-up means, one end of each of said slave arm linear motion transmission members being connected to the extensible portion of the slave arm, the other end of each of said slave arm linear motion transmission members being connected to a slave arm rotary take-up means, said rotary take-up means being interconnected for rotation together the means interconnecting the take-up means being variable whereby the ratio of rotation between the rotary take-up means may be varied.

17. A manipulator according to claim 1 further characterized in that a pair of vertically spaced parallel links extend through said horizontal support, said links being disposed above and below the pivot axes of the stationary portions of said master arm and slave arm pivotally connected to said horizontal support, one end of each of said links being connected to the stationary portion of said slave arm, the other end of each of said links being connected to a rocker member pivotally mounted in the master arm end of said horizontal support on an axis parallel to the pivot axis of the slave arm, said rocker member being connected to the stationary portion of said master arm for pivotal movement therewith by adjustable link means whereby the ratio of pivotal motion between the master arm and slave arm may be varied, and in that the extensible portions of said master arm and slave arm are interconnected with each other by means of a plurality of flexible linear motion transmission members whereby extension of the extensible portion of said master arm causes extension of the extensible portion of said slave arm, one end of each of said master arm linear motion transmission members being connected to the extensible portion of said master arm, the other end of each of said master arm linear motion transmission members being connected to a master arm rotary take-up means, one end of each of said slave arm linear motion transmission members being connected to the extensible portion of the slave arm, the other end of each of said slave arm linear motion transmission members being connected to a slave arm rotary take-up means, said rotary take-up means being interconnected for rotation together the means interconnecting the take-up means being variable whereby the ratio of rotation between the rotary take-up means may be varied.

18. A manipulator according to claim 1 further characterized in that one portion of said horizontal support to which said stationary portion of said master arm is pivotally connected is rotatable about the longitudinal axis of said horizontal support relative to the portion of said horizontal support to which said relatively stationary portion of said slave arm is pivotally connected and said relatively rotatable portions of said horizontal support are connected together for rotation together at different rates and over different distances; a pair of vertically spaced parallel links extend through said horizontal support, said links being disposed above and below the pivot axes of the stationary portions of said master arm and slave arm pivotally connected to said horizontal support, one end of each of said links being connected to the stationary portion of said slave arm, the other end of each of said links, being connected to a rocker member pivotally mounted in the master arm end of said horizontal support on an axis parallel to the pivot axis of the slave arm, said rocker member being connected to the stationary portion of said master arm for pivotal movement therewith by adjustable link means whereby the ratio of pivotal motion between the master arm and slave arm relative to the horizontal support may be varied; and the extensible portions of said master arm and slave arm are interconnected with each other by means of a plurality of elongated flexible linear motion transmission members whereby extension of the extensible portion of said master arm causes extension of the extensible portion of said slave arm, one end of each of said master arm linear motion transmission members being connected to the extensible portion of said master arm, the other end of each of said master arm linear motion transmission members being connected to a master arm rotary take-up means, one end of each of said slave arm linear motion transmission members being connected to the extensible portion of the slave arm, the other end of each of said slave arm linear motion transmission members being connected to a slave arm rotary take-up means, said rotary take-up means being interconnected for rotation together the means interconnecting the take-up means being variable whereby, the ratio of rotation between the rotary take-up means may be varied.

19. A manipulator according to claim 1 further characterized in that the relatively stationary portion of said master arm is provided with counterweight means for balancing said arm in its movement about its pivotal connection with said horizontal support and its movement with said horizontal support about the longitudinal axis thereof, the extensible portion of said master arm is provided with counterweight means for balancing said extensible portion in its movement relative to the stationary portion of said arm, the relatively stationary portion of said slave arm is provided with independent counterweight means for balancing said arm in its movement about its pivotal connection with said horizontal support and its movement with said horizontal support about the longitudinal axis thereof, and the extensible portion of said slave arm is provided with independent counterweight means for balancing said extensible portion in its movement relative to the stationary portion of said arm.

20. A remote-control master-slave manipulator comprising a horizontal support adapted for rotation about its longitudinal axis, a master arm having a relatively stationary portion pivotally connected to one end of said support and a slave arm having a relatively stationary portion pivotally connected to the other end of said support, the relatively stationary portions of said master arm and slave arm being movable relative to said horizontal support on their pivotal connections and movable with said horizontal support about its longitudinal axis, but stationary as to movement transverse to the longitudinal axis of said horizontal support, counterweight means associated with the stationary portion of said master arm for balancing said arm in its movement about its pivotal connection with said horizontal support and its movement with said horizontal support about the longitudinal axis thereof, independent counterweight means associated with the stationary portion of said slave arm for balancing said arm in its movement about its pivotal connection with said horizontal support and its movement with said horizontal support about the longitudinal axis thereof, an extensible portion on said master arm and an extensible portion on said slave arm movable in response to movement of the extensible portion of the master arm, counterweight means associated with the extensible portion of said master arm to balance said extensible portion in its movement relative to the stationary portion of said arm, and independent counterweight means associated with the extensible portion of said slave arm to balance said extensible portion in its movement relative to the stationary portion of said arm.

21. A manipulator according to claim 20 further characterized in that the counterweight means associated with the stationary portion of the master arm is mounted on the top end of said master arm above its pivotal connection with said horizontal support and is of such weight so as to bring the center of mass of the master arm assembly close to the longitudinal and transverse pivot axes of the stationary portion of said master arm.

22. A manipulator according to claim 20 further characterized in that the counterweight means associated with the stationary portion of said slave arm is mounted on said horizontal support for movement therewith about the longitudinal axis of the horizontal support and pivotally mounted for movement relative thereto in response to movement of said slave arm about its pivotal connection to said horizontal support, said counterweight means being so mounted and of a weight to balance said slave arm.

23. A manipulator according to claim 20 further characterized in that the counterweight means associated with the extensible portion of said master arm is located within the stationary portion of the master arm for movement longitudinally thereof and the extensible portion of the master arm is connected thereto for movement in the opposite direction, said counterweight means being of a weight to balance said extensible portion.

24. A manipulator according to claim 20 further characterized in that the counterweight means associated with the extensible portion of said slave arm is mounted around the outside of the stationary portion of the slave arm for movement longtiudinally thereof and the extensible portion of the slave arm is connected thereto for movement in the opposite direction, said counterweight means being of a weight to balance said extensible portion.

References Cited by the Examiner

UNITED STATES PATENTS

| 2,888,154 | 5/1959 | Jelatis et al. | 214—1 |
| 3,031,090 | 4/1962 | Stephenson | 214—1 |
| 3,065,863 | 11/1962 | Saunders | 214—1 |
| 3,133,649 | 5/1964 | Serrell | 214—1 |

GERALD M. FORLENZA, *Primary Examiner.*

R. G. SHERIDAN, *Assistant Examiner.*

Disclaimer 3,297,172.—*Lester W. Haaker* and *Demetrius G. Jelatis*, Red Wing, and *Carleton E. Jennrich*, St. Paul, Minn. MASTER-SLAVE MANIPULATOR. Patent dated Jan. 10, 1967. Disclaimer filed Jan. 28, 1977, by the assignee, *Central Research Laboratories, Inc.*

Hereby enters this disclaimer to claims 20, 21, 22 and 24 of said patent.

[*Official Gazette July 26, 1977.*]